US012275125B2

(12) United States Patent
Jing

(10) Patent No.: US 12,275,125 B2
(45) Date of Patent: Apr. 15, 2025

(54) VIBRATION SUPPRESSION SPLIT HANDLE STRUCTURES FOR HIGH-VIBRATION HANDHELD

(71) Applicant: City University of Hong Kong, Kowloon (HK)

(72) Inventor: Xingjian Jing, Sha Tin (HK)

(73) Assignee: City University of Hong Kong, Kowloon (HK)

( * ) Notice: Subject to any disclaimer, the term of this patent is extended or adjusted under 35 U.S.C. 154(b) by 162 days.

(21) Appl. No.: 18/124,904

(22) Filed: Mar. 22, 2023

(65) Prior Publication Data

US 2024/0316741 A1 Sep. 26, 2024

(51) Int. Cl.
*B25D 17/04* (2006.01)

(52) U.S. Cl.
CPC .... *B25D 17/043* (2013.01); *B25D 2217/0073* (2013.01); *B25D 2250/371* (2013.01)

(58) Field of Classification Search
CPC .......... B25D 17/043; B25D 2217/0073; B25D 2250/371
See application file for complete search history.

(56) References Cited

U.S. PATENT DOCUMENTS 4,576,241 A * 3/1986 Emonet ................ B25D 17/043 173/162.2
4,673,043 A * 6/1987 Greppmair ............ B25D 17/11 173/211
7,971,655 B2 * 7/2011 Steinke ................ B25D 17/043 173/90
8,342,260 B2 * 1/2013 Buchenau ............ B25D 17/043 173/162.1
12,109,673 B1 * 10/2024 Jing ..................... B25D 17/043
2007/0144750 A1 * 6/2007 Buchenau ................ B25G 1/01 173/162.1
2019/0283228 A1 * 9/2019 Jing ..................... B25D 17/043

OTHER PUBLICATIONS

Y.K. Dange et al., Analysis of a nonlinear vibration isolator with the help of an analog computer, Indian J. Technol. 16 (1978) 282-285.

(Continued)

*Primary Examiner* — Michelle Lopez
(74) *Attorney, Agent, or Firm* — Norton Rose Fulbright US LLP

(57) ABSTRACT

Vibration suppression handle structures for high-vibration handheld machines (e.g., jackhammers) are provided that offer improved vibration suppression. The handle structures of examples include two handles that are rotatably connected to X-shaped structures for vibration suppression. For instance, one side of each of the first and second handles is rotatably connected to one of the X-shaped structures, and the other side of each of the first and second handles is rotatably connected to the second X-shaped structure. The X-shaped structures of examples are adjustable in size and stiffness and thus can be adapted for different sized or shaped handheld machines. Jackhammers are further provided that include the vibration suppression handle structures.

20 Claims, 20 Drawing Sheets

(56) References Cited

OTHER PUBLICATIONS

M.S. Hundal et al., Response of a base excitation system with Coulomb and viscous friction, J. Sound Vibr. 64 (3) (1979) 371-378.
T.A. Nayfeh et al., Application of nonlinear localization to the optimization of a vibration isolation system, Am. Inst. Aeronautics Astronautics J. 35 (8) (1997) 1378-1386.
Ibrahim, R.A., Recent advances in nonlinear passive vibration isolators, J. Sound Vib. 314 (2008) 371-452.
I. Kovacic et al., A study of a nonlinear vibration isolator with a quasi-zero-stiffness characteristic, J. Sound Vibr. 315 (3) (2008) 700-711.
X.J. Jing et al., Frequency domain analysis of a dimensionless cubic nonlinear damping system subject to harmonic input, Nonlinear Dyn. 58 (3) (2009) 469-485.
T.D. Le et al., A vibration isolation system in low frequency excitation region using negative stiffness structure for vehicle seat, J. Sound Vibr. 330 (26) (2011) 6311-6335.
T.A. Su et al, Hand-arm vibration syndrome among a group of construction workers in Malaysia, J. Occup Environ. Med. 68 (1) (2011) 58-63.
C.M. Lee et al., A multi-stage high-speed railroad vibration isolation system with "negative" stiffness, J. Sound Vibr. 331 (4) (2012) 914-921.
Wang, Y. et al, : Human head-neck models in whole-body vibration: effect of posture. J. Biomech. 46, 702-710 (2013).
Tarabini, M. et al, Analysis of non-linear response of the human body to vertical whole-body vibration. Ergonomics 57(11), 1711-1723 (2014).
X.J. Jing et al., Nonlinear characteristic output spectrum for nonlinear analysis and design, IEEE/ASMETrans. Mechatron. 19 (1) (2014) 171-183.
X. Sun et al., Vibration isolation via a scissor-like structured platform, J. Sound Vibr. 333 (9) (2014) 2404-2420.
C.C. Liu et al., Recent advances in micro-vibration isolation, Mech. Syst. Signal Process. 56-57 (2015) 55-80.
X.J. Jing et al., Frequency Domain Analysis and Design of Nonlinear Systems Based on Volterra Series Expansion: A Parametric Characteristic Approach, Springer International Publishing, Switzerland, 2015.
Z. Wu et al., Robert Allen, Vibration isolation by exploring bio-inspired structural nonlinearity, Bioinspiration Biomimetics 10 (5) (2015), 056015-056015.
F. Hu et al., A 6-DOF passive vibration isolator based on Stewart structure with X-shaped legs, Nonlinear Dyn. 91 (2018) 157-185.
J. Bian et al., Superior nonlinear passive damping characteristics of the bio-inspired limb-like or X-shaped structure, Mech. Syst. Signal Process. 125 (2019) 21-51.
Y. Chai et al., Analysis X-shaped mechanism based enhanced tunable QZS property for passive vibration isolation, Int. J. Mech. Sci. 168 (2022) 108-651.
J.E. Ruzicka et al., Influence of damping in vibration isolation, the shock and vibration information center, Shock and Vibration Information Center, Washington, DC, 1971, http://www.dtic.mil/docs/citations/AD0737829.
Mechanical vibration—Measurement and evaluation of human exposure to hand-transmitted vibration. ISO 5349-2001. https://www.iso.org/standard/32355.html.

* cited by examiner

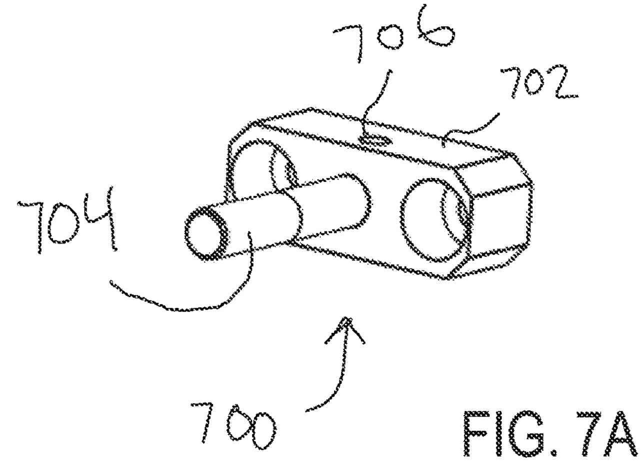
FIG. 7A
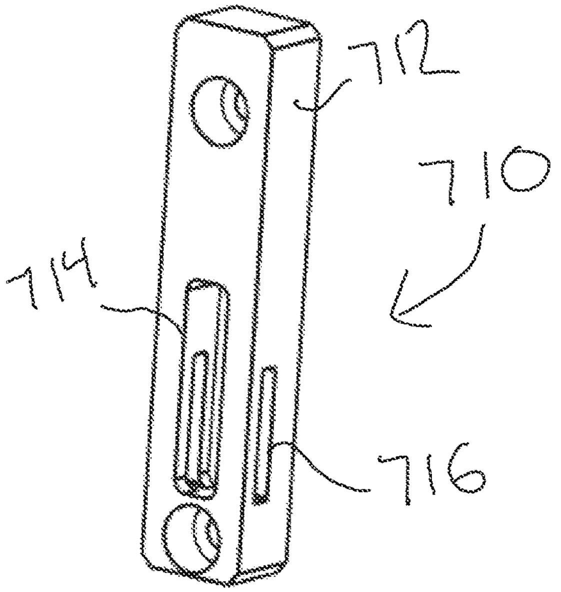
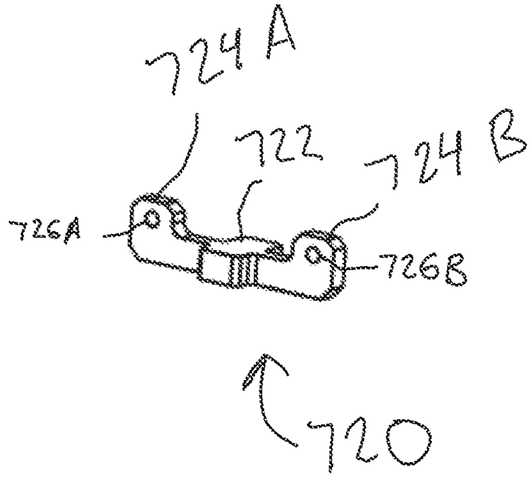
FIG. 7C
FIG. 7B
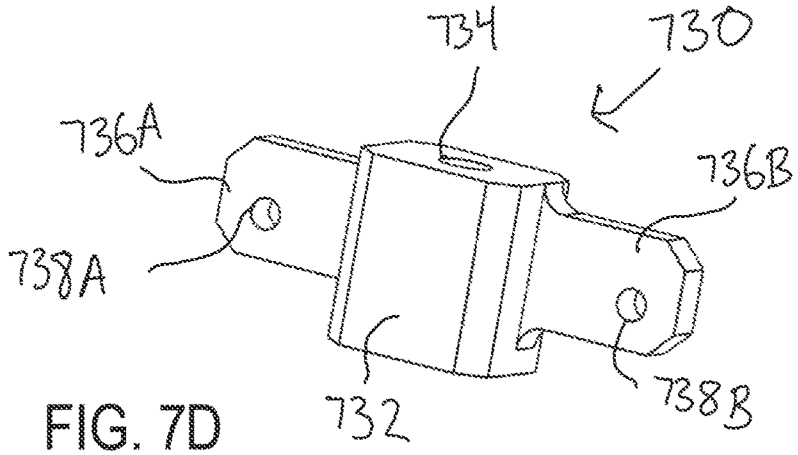
FIG. 7D

| Displacement (mm) | F (N) | F0 (N) | Displacement (mm) | F (N) | F0 (N) |
|---|---|---|---|---|---|
| 0 | 74.48 | 56.84 | 35 | 144.06 | 128.49 |
| 1 | 76.44 | 59.18 | 38 | 147.98 | 133.16 |
| 2 | 78.4 | 61.03 | 41 | 151.9 | 137.84 |
| 4 | 88.2 | 69.41 | 45 | 156.8 | 143.78 |
| 6 | 93.1 | 74.03 | 54 | 163.66 | 153.24 |
| 8 | 98 | 78.71 | 59 | 167.58 | 158.51 |
| 10 | 104.86 | 85.04 | 63 | 171.5 | 163.43 |
| 12 | 108.78 | 89.04 | 66 | 173.46 | 166.15 |
| 14 | 112.7 | 93.08 | 73 | 176.4 | 170.80 |
| 17 | 117.6 | 98.38 | 79 | 178.36 | 174.07 |
| 20 | 124.46 | 105.39 | 85 | 180.32 | 177.17 |
| 23 | 128.38 | 109.97 | 95 | 182.28 | 180.66 |
| 25 | 132.3 | 114.17 | 105 | 180.32 | 179.75 |
| 30 | 137.2 | 120.46 | 118 | 176.4 | 176.39 |

FIG. 16

| F (N) | Δy (mm) in 1st measurement | Δy (mm) in 2nd measurement | F (N) | Δy (mm) in 1st measurement | Δy (mm) in 2nd measurement |
|---|---|---|---|---|---|
| 88.2 | 0 | 0 | 196 | 33 | 33 |
| 92.12 | 1 | 1 | 205.8 | 36 | 36 |
| 94.08 | 1.5 | 1.8 | 215.6 | 40 | 39 |
| 98 | 3 | 3.2 | 225.4 | 43 | 43 |
| 102.9 | 4 | 4 | 235.2 | 47 | 47 |
| 107.8 | 5 | 5 | 245 | 51 | 51.5 |
| 117.6 | 7 | 7 | 254.8 | 56 | 56 |
| 127.4 | 9 | 10 | 264.6 | 62 | 62 |
| 137.2 | 13 | 13 | 274.4 | 70 | 71 |
| 147 | 16 | 16 | 284.2 | 83 | 82 |
| 156.8 | 19 | 20 | 288.12 | 95 | 94 |
| 166.6 | 23 | 23 | 286.16 | 110 | 111 |
| 176.4 | 26 | 26.5 | 282.24 | 119 | 118 |
| 186.2 | 30 | 30 | | | |

FIG. 17

VIBRATION SUPPRESSION SPLIT HANDLE STRUCTURES FOR HIGH-VIBRATION HANDHELD

TECHNICAL FIELD

The present application relates generally to high-vibration handheld machines such as jackhammers. More specifically, the present application relates to vibration suppression handle structures that include X-shaped support structures and an arrangement of resilient members to provide improved vibration suppression for high-vibration handheld machines.

BACKGROUND OF THE INVENTION

Prolonged and/or frequent vibration is typically undesirable for machines and structures as vibration can cause their destruction. In humans, prolonged and/or frequent vibration can induce discomfort, fatigue, hearing problems, or vibration-related syndrome, which includes damage to sensory nerves, muscles and joints in the hands and arms. Workers (e.g., construction, engineering, agriculture, or mining workers) that use high-vibration equipment (e.g., jackhammers, hydraulic breakers, etc.) are therefore at risk of these vibration-related symptoms.

High-vibration equipment used by humans typically includes at least one vibration suppressor to reduce the vibrations transferred to the body of a human operator. Typical vibration suppressors (e.g., traditional springs or dampers) applied in a traditional way, however, do not suitably protect against the damage caused by vibration. For instance, with typical high-vibration equipment in the form of a jackhammer, a worker needs to press down to hold the equipment tightly in order for high demolition efficiency, which assists in transferring vibration to the worker. Additionally, the compression in traditional springs or damper materials leads to dramatically increasing stiffness and consequently limits vibration suppression.

BRIEF SUMMARY OF THE INVENTION

New and innovative vibration suppression handle structures for high-vibration handheld machines (e.g., jackhammers, hydraulic breakers, hammer drills, soil compactors, etc.) are provided that offer improved vibration suppression. The handle structures provided according to embodiments include two handles that are rotatably connected to vibration suppression systems that include X-shaped structures and an arrangement of at least one resilient member for vibration suppression. For instance, one side of each of the first and second handles is rotatably connected to a first vibration suppression system and therefore one of the X-shaped structures, and the other side of each of the first and second handles is rotatably connected to a second vibration suppression system and therefore a second X-shaped structure. The handle structures including the vibration suppression systems enable multi-direction (e.g., three degrees-of-freedom) vibration suppression. For example, the handle structures achieve vibration suppression in the longitudinal direction (e.g., y-axis), the lateral direction (e.g., x-axis), and the rotational direction (e.g., z-axis). The vibration suppression systems of embodiments are adjustable in size and stiffness and thus can be adapted for different sized or shaped handheld machines.

The vibration suppression systems of the handle structures can achieve a flexible nonlinear stiffness, which contains zero or quasi-zero stiffness (QZS), negative stiffness and positive stiffness. A smooth multi-equilibria state is also achievable. In at least some examples, when the handles of the jackhammer are pressed down, the loading capacity increases rapidly, but with a decreasing stiffness compared to the increasing stiffness of typical elastic materials (e.g., coil springs), and soon reaches the working quasi-zero stiffness region, which results in low resonant frequency (e.g., near zero or equal to zero) of the vibration suppression system (e.g., from the jackhammer body to the handles) and consequently improved vibration suppression performance when working in the quasi-zero stiffness region. Other properties of the working quasi-zero stiffness region include that the resulting resonant frequency decreases as the downward force on the jackhammer increases, and that the structural parameters of the handle structures can be designed to enable a large quasi-zero stiffness region so as to bear with large vibration displacement (e.g., up to 10 cm) required by high-vibration handheld machines. Accordingly, operators of a high-vibration handheld machine equipped with an embodiment of the provided handle structure are subjected to less vibration than when using a high-vibration handheld machine with a typical handle structure.

The handle structures in embodiments can include a mechanism by which to adjust a stiffness, and therefore vibration suppression, of the vibration suppression systems of the handle structures. The stiffness adjustment mechanism can compensate the stiffness of the vibration suppression system in the negative stiffness region, and can also meet the needs of different operators while extending the working quasi-zero stiffness region. The stiffness adjustment mechanism can, additionally or alternatively, be used to increase loading capacity of the high-vibration handheld machine such that downward pushing force on the high-vibration handheld machine can be increased to improve efficiency of the high-vibration handheld machine when performing a task (e.g., demolition). In an example, the stiffness adjustment mechanism includes a guide, a stop member positioned within a slit of the guide, and a nut member connected to the stop member by resilient members. A bolt (or other suitable pivot member) that forms a joint of a support structure of the vibration suppression system contacts the stop member such that the energy of the resilient members between the stop member and the nut member influences movement of the bolt and therefore of the support structure of the vibration suppression system. A threaded member is connected to the nut member and can be rotated to adjust a distance between the nut member and the stop member, which adjusts a stiffness of the resilient members and therefore a stiffness of the vibration suppression system.

In a first aspect, a handle structure for vibration suppression includes a first handle member rotatable about a first axis; a second handle member connected to the first handle member and rotatable about the first axis; a first support member rotatable about a second axis and a third axis; a second support member rotatable about a fourth axis and a fifth axis; a third support member connected to the first support member and rotatable about the third axis and a sixth axis; and a fourth support member connected to the second support member and rotatable about the fifth axis and the sixth axis. The second axis is disposed at a first location on the first handle member. The fourth axis is disposed at a second location on the second handle member.

In a second aspect, which may be combined with other aspects described herein (e.g., the 1st aspect), the handle structure further includes a rod extending along the first axis and through openings in each of the first and second handle members; a nut; a fixation member extending through the rod and connected to the nut; a stop member; and at least one resilient member that connects the nut to the stop member.

In a third aspect, which may be combined with other aspects described herein (e.g., the $2^{nd}$ aspect), the handle structure further includes a guide member that includes a slit. The stop member is disposed within the slit.

In a fourth aspect, which may be combined with other aspects described herein (e.g., the $3^{rd}$ aspect), rotating the fixation member adjusts an amount of resistance of the first and second handle members to rotate about the first axis.

In a fifth aspect, which may be combined with other aspects described herein (e.g., the $1^{st}$ aspect through the $4^{th}$ aspect), the handle structure further includes a first resilient member rotatable about the first axis and the third axis; and a second resilient member rotatable about the first axis and the fifth axis.

In a sixth aspect, which may be combined with other aspects described herein (e.g., the $6^{th}$ aspect), the handle structure further includes a third resilient member rotatable about the third axis and the fifth axis.

In a seventh aspect, which may be combined with other aspects described herein (e.g., the $1^{st}$ aspect through the $6^{th}$ aspect), the third support member is further rotatable about a seventh axis, and the fourth support member is further rotatable about an eighth axis. Additionally, the handle structure further includes a fifth support member rotatable about the seventh axis, a ninth axis, and a tenth axis; a sixth support member rotatable about the eighth axis, the ninth axis, and an eleventh axis; an eighth support member rotatable about the eleventh axis and a twelfth axis; and a ninth support member rotatable about the tenth axis and the twelfth axis.

In an eighth aspect, which may be combined with other aspects described herein (e.g., the $7^{th}$ aspect), the handle structure further includes a fourth resilient member rotatable about the seventh axis and the eighth axis.

In a ninth aspect, which may be combined with other aspects described herein (e.g., the $2^{nd}$ aspect through the $8^{th}$ aspect), a handle structure for vibration suppression includes a first handle; a second handle; a first vibration suppression system rotatably connected to the first handle and to the second handle; and a second vibration suppression system rotatably connected to the first handle and to the second handle. The first vibration suppression system includes a first X-shaped support structure. The second vibration suppression system includes a second X-shaped support structure.

In a tenth aspect, which may be combined with other aspects described herein (e.g., the $9^{th}$ aspect), the first handle and the second handle are each configured to rotate about a first rotation joint.

In an eleventh aspect, which may be combined with other aspects described herein (e.g., the $9^{th}$ aspect through the $10^{th}$ aspect), the first X-shaped support structure is rotatably connected to the first handle via a first support member and to the second handle via a second support member, and the second X-shaped support structure is rotatably connected to the first handle via a third support member and to the second handle via a fourth support member.

In a twelfth aspect, which may be combined with other aspects described herein (e.g., the $9^{th}$ aspect through the $11^{th}$ aspect), the first X-shaped support structure includes a fifth support member and a sixth support member, wherein the fifth support member is connected to the first support member at a second rotation joint, wherein the sixth support member is connected to the second support member at a third rotation joint, and wherein the fifth support member is connected to the sixth support member at a fourth rotation joint.

In a thirteenth aspect, which may be combined with other aspects described herein (e.g., the $12^{th}$ aspect), the handle structure further includes resilient member connecting the second rotation joint to the third rotation joint.

In a fourteenth aspect, which may be combined with other aspects described herein (e.g., the $11^{th}$ aspect through the $13^{th}$ aspect), the handle structure further includes a third X-shaped support structure rotatably connected to the first X-shaped support structure.

In a fifteenth aspect, which may be combined with other aspects described herein (e.g., the $1^{st}$ aspect through the $8^{th}$ aspect), a jackhammer includes a body; and a handle structure connected to the body. The handle structure includes: a plurality of X-shaped support structures that each include a first support member and a second support member; a handle connected to the plurality of X-shaped support structures; and a resilient member that connects the first support member of a first X-shaped support structure of the plurality of X-shaped support structures to the second support member of the first X-shaped support structure.

In a sixteenth aspect, which may be combined with other aspects described herein (e.g., the $15^{th}$ aspect), the jackhammer further includes a mounting structure connected to the body. The handle structure is connected to the body via the mounting structure.

In a seventeenth aspect, which may be combined with other aspects described herein (e.g., the $15^{th}$ through the $16^{th}$ aspect), the jackhammer further includes a housing. At least a portion of the X-shaped support structures are disposed within the housing.

In an eighteenth aspect, which may be combined with other aspects described herein (e.g., the $15^{th}$ aspect through the $17^{th}$ aspect), the handle is a first handle, and the jackhammer further includes a second handle. The plurality of X-shaped support structures includes a first plurality of X-shaped support structures and a second plurality of X-shaped support structures, and each of the first handle and the second handle is connected to the first plurality of X-shaped support structures and the second plurality of X-shaped support structures.

In a nineteenth aspect, which may be combined with other aspects described herein (e.g., the $18^{th}$ aspect), the first plurality of X-shaped support structures are disposed on a first side of the body, and the second plurality of X-shaped support structures are disposed on a second side of the body directly opposite the first side.

In a twentieth aspect, which may be combined with other aspects described herein (e.g., the $15^{th}$ aspect through the $19^{th}$ aspect), the resilient member is a first resilient member, and the jackhammer further includes a second resilient member. The plurality of X-shaped support structures includes a first X-shaped support structure and a second X-shaped support structure connected to the first X-shaped support structure. The first resilient member connects the first support member of the first X-shaped support structure to the second support member of the first X-shaped support structure, and the second resilient member connects the first support member of the second X-shaped support structure to the second support member of the second X-shaped support structure.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIGS. 7A to 7F illustrate various components of the vibration suppression system, according to an aspect of the present disclosure.

FIG. 16 is a table of measured force and displacement data for a jackhammer including a handle structure that has four horizontal resilient members.

FIG. 17 is a table of measured force and displacement data for a jackhammer including a handle structure that has eight horizontal resilient members and four diagonal resilient members.

DETAILED DESCRIPTION OF THE INVENTION

Figure 1A:
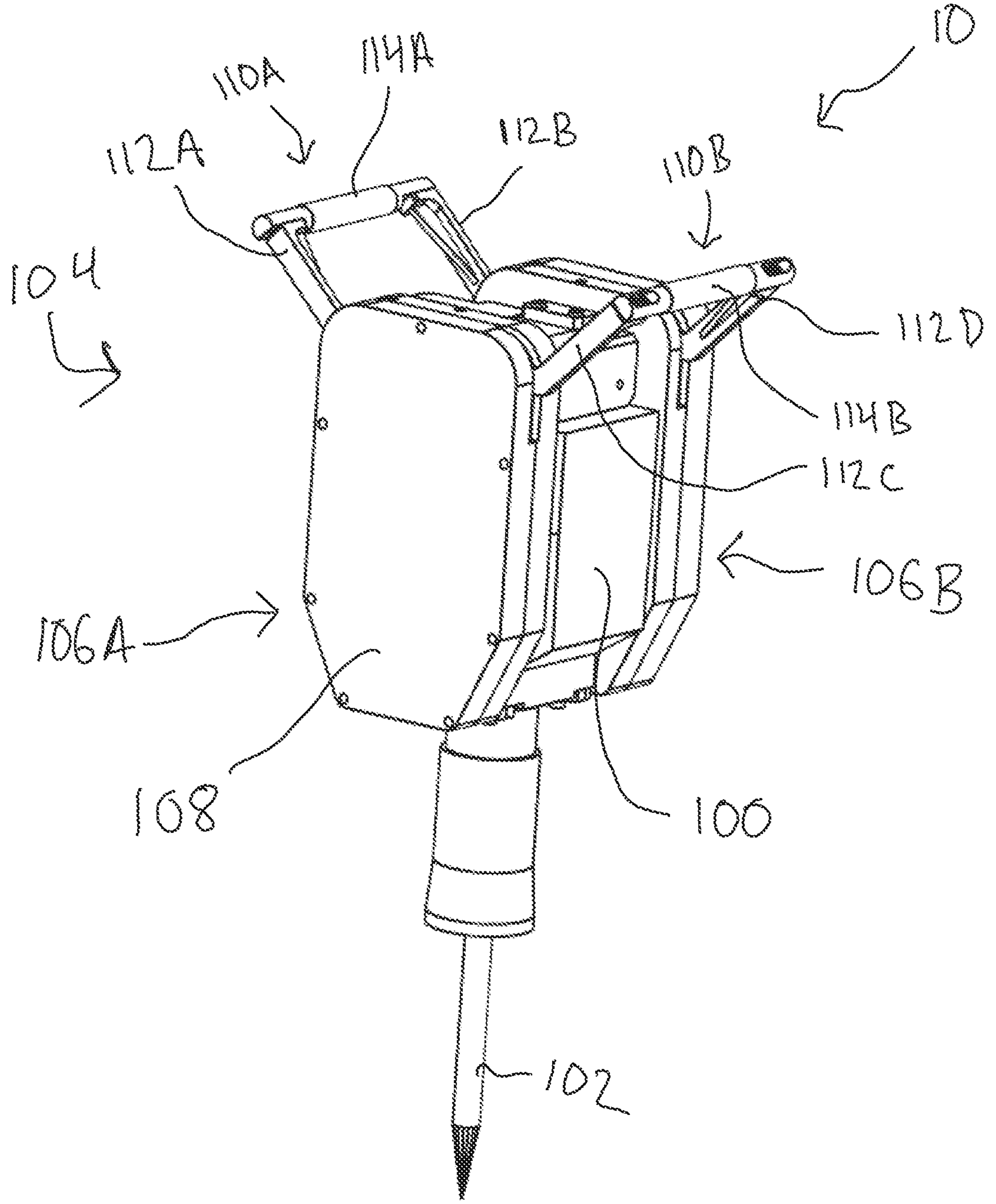
FIG. 1A illustrates a perspective view of a jackhammer, according to an aspect of the present disclosure.

The present disclosure provides new and innovative handle structures for high-vibration handheld machines. For example, new and innovative jackhammers are provided with an embodiment of the handle structures. In at least some embodiments, an existing handle structure on a typical jackhammer may be removed and replaced by an embodiment of the provided handle structure. The provided handle structures include two handles that are rotatably connected to vibration suppression systems that include X-shaped support structures and an arrangement of resilient members for improved vibration suppression over typical high-vibration handled machines while remaining a compact design. The handle structures including the vibration suppression systems enable multi-direction (e.g., three degrees-of-freedom) vibration suppression. For example, the handle structures achieve vibration suppression in the longitudinal direction (e.g., y-axis), the lateral direction (e.g., x-axis), and the rotational direction (e.g., z-axis). In at least some embodiments, the handle structures include a mechanism by which to adjust a stiffness, and therefore vibration suppression, of the vibration suppression systems. The stiffness adjustment mechanism can compensate the stiffness of the vibration suppression system in the negative stiffness region, and can also meet the needs of different operators while extending the quasi-zero stiffness region.

In operation according to embodiments, the provided handle structures are ergonomic in that provide a relatively stable handle level and reactive force for an operator of the provided jackhammers while obtaining the high-efficiency vibration suppression effect, which enables the jackhammers to meet the complex and high-intensity work required of the jackhammers. The vibration suppression systems of the handle structures can also achieve a flexible nonlinear stiffness, which contains zero or quasi-zero stiffness (QZS), negative stiffness and positive stiffness. A smooth multi-equilibria state is also achievable. In at least some examples, when the handles of the jackhammer are pressed down, the loading capacity increases rapidly, and soon reaches the working quasi-zero stiffness area, which results in improved vibration suppression performance when working in the quasi-zero stiffness region. Accordingly, operators of a high-vibration handheld machine equipped with an embodiment of the provided handle structure are subjected to less vibration than when using a high-vibration handheld machine with a typical handle structure.

While reference is made to jackhammers throughout this description, one having skill in the art will appreciate how to implement the provided vibration suppression handle structures into other suitable high-vibration handheld machines (e.g., hydraulic breakers, hammer drills, soil compactors, etc.) operated manually by humans. For instance, in any of the embodiments of the handle structure, the various parameters of the handle structure (e.g., support member lengths, spring stiffness, initial assembly angles, spring connection parameters, etc.) can be selected (e.g., tuned) to flexibly meet various requirements of the different applications of the handle structure. For instance, different applications of the handle structure can have their own specific requirements, such as a working displacement range, a height of the handle structure, and/or a payload and frequency range of external excitation. In an example, initial assembly angles can be selected, and then by combining the selected initial assembly angles with a desired height of the handle structure, the support member lengths can be determined. In another example, the stiffness parameters of the springs in the handle structure can be determined by adjusting the spring stiffness until the handle structure satisfies the requirements of the desired payload and working displacement range. In another example still, the support member lengths and spring connection parameters can be adjusted to obtain a desired loading capacity and quasi-zero stiffness (QZS) zone requirements.

Reference is made herein to joints that facilitate rotation of two connected components with respect to one another. Any suitable joint that connects two components and enables such movement may be used. For example, a bar or bolt positioned through respective openings in each of the two components is one such suitable joint. In various embodiments, a joint may include a pressure ball bearing, a washer, a nut, or any other suitable component for a machine capable of producing high vibrations.

The term "connected" and its other forms are used herein to encompass both direct and indirect connections unless indirect or direct connection is specified. For example, a component A that is connected to a component B, which is connected to a component C, is connected to both component B and component C as the term "connected" is used herein.

As used herein, a resilient member is an elastic component that repeatedly stores and releases mechanical energy. For example, a resilient member may be any suitable spring (e.g., coil spring, extension/tension spring, machined spring, etc.) constructed of any suitable material (e.g., metal, polymer, etc.). In other examples, a resilient member may other suitable resilient mechanisms, such as bendable metal or plastic beams, rubber, metal rubber, a pneumatic bag, magnetic materials, etc.

Figure 1B:
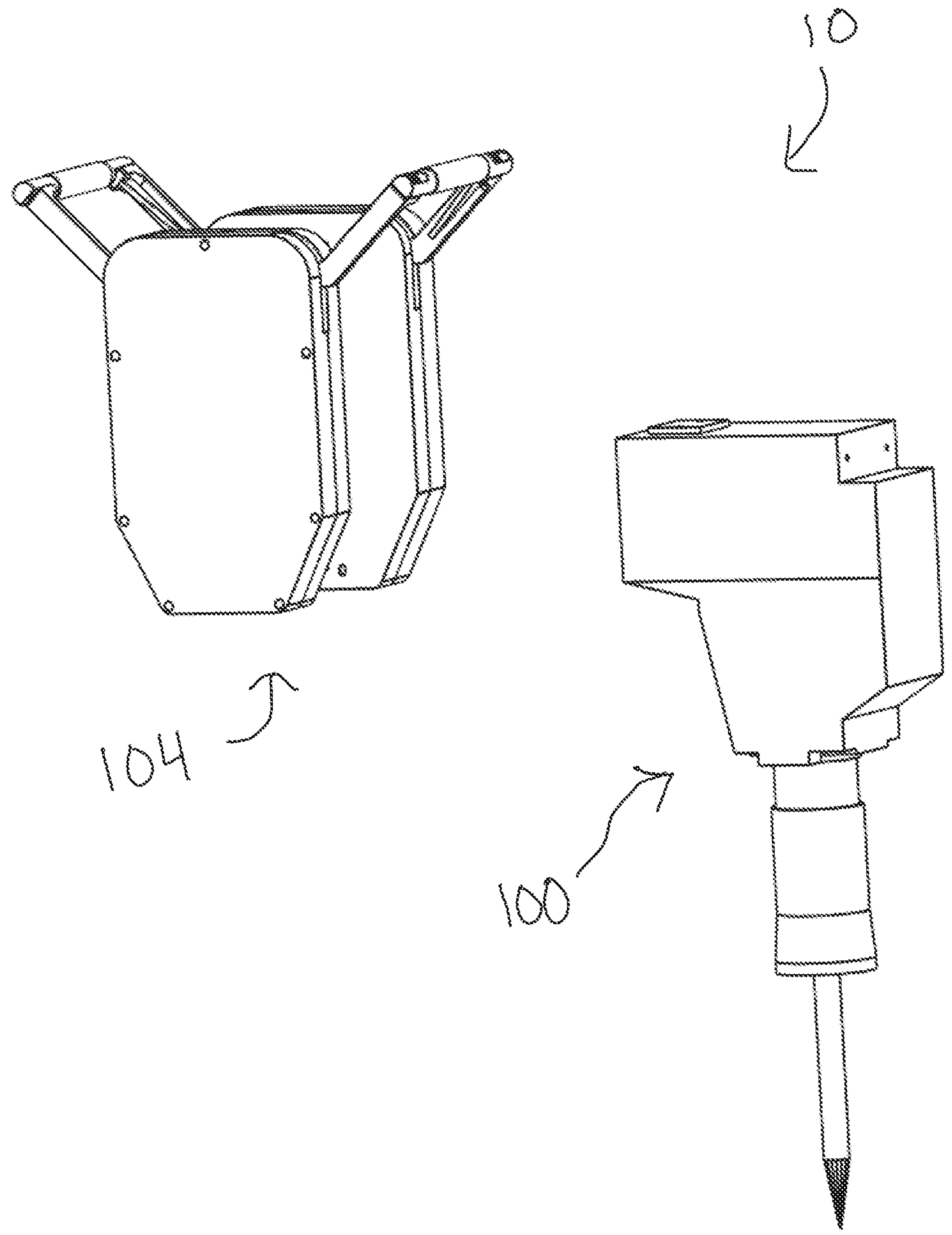
FIG. 1B illustrates a perspective view of the jackhammer of FIG. 1A with the handle structure separate from the jackhammer body, according to an aspect of the present disclosure.

FIGS. 1A and 1B illustrate an example jackhammer 10 that includes a jackhammer body 100 and a handle structure 104. FIG. 1A illustrates the handle structure 104 connected to the jackhammer body 100, whereas FIG. 1B illustrates the handle structure 104 separate from the jackhammer body 100. In various embodiments, the handle structure 104 is connected to the jackhammer body 100 via a mounting structure. The mounting structure is not shown in FIG. 1B, but will be described below. The jackhammer body 100 houses the pneumatic, mechanical, and/or electro-mechanical components, as is known in the art, for driving the hammer 102 of the jackhammer body 100.

The handle structure 104 includes a housing 106A that houses a first vibration suppression system and a housing 106B that houses a second vibration suppression system. The following description of the housing 106A and of the vibration suppression system within the housing 106A applies equally to the housing 106B and to the vibration suppression system within the housing 106B, which are not described separately in detail in the remaining disclosure. For example, the housing 106A includes an outer cover 108A and the housing 106B similarly includes an outer cover that is partially hidden from view and not indicated with a reference numeral in FIG. 1A.

The handle structure 104 further includes a handle 110A and a handle 110B. In various embodiments, such as the illustrated embodiment, the handle 110A and the handle 110B each include multiple discrete components that are connected to one another to form the handle 110A and the handle 110B, respectively. Specifically, in the illustrated embodiment, the handle 110A includes a handle member 112A, a handle member 112B, and a handle member 114A that are connected to one another, and the handle 110B includes a handle member 112C, a handle member 112D, and a handle member 114B that are connected to one another. The discrete components of the handle 110A and the handle 110B may be connected via a suitable connection mechanism (e.g., screws, rivets, bolts, adhesives, etc., collectively referred to herein as fasteners). In other embodiments, the handle 110A and/or the handle 110B may be a single, integral component.

Figure 2:
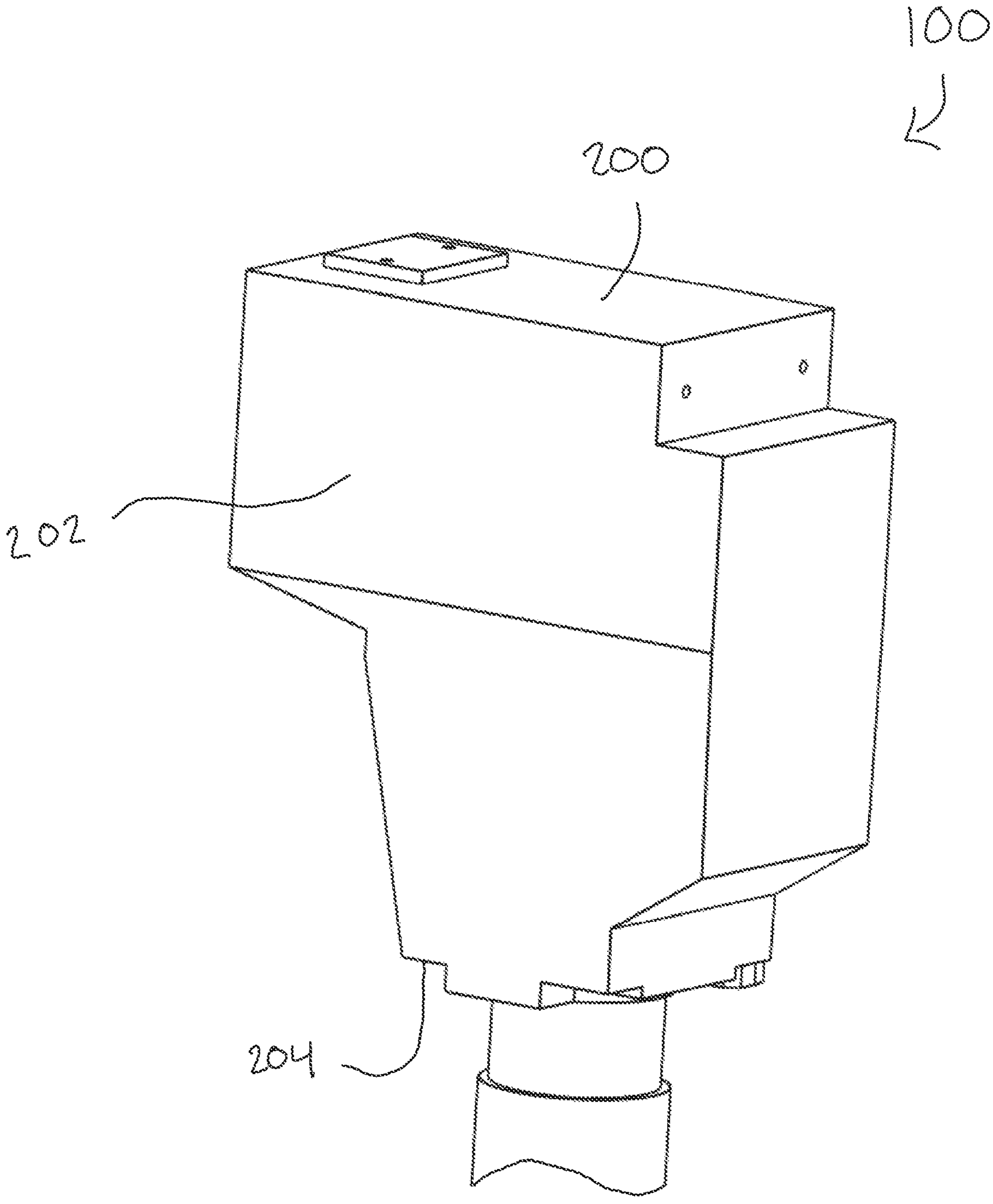
FIG. 2 illustrates a jackhammer body, according to an aspect of the present disclosure.

FIG. 2 illustrates an upper portion of the jackhammer body 100. The jackhammer body 100 includes an upper surface 200, a side surface 202, and a lower surface 204. An additional side surface is directly opposite the side surface 202 on the jackhammer body 100.

Figure 3:
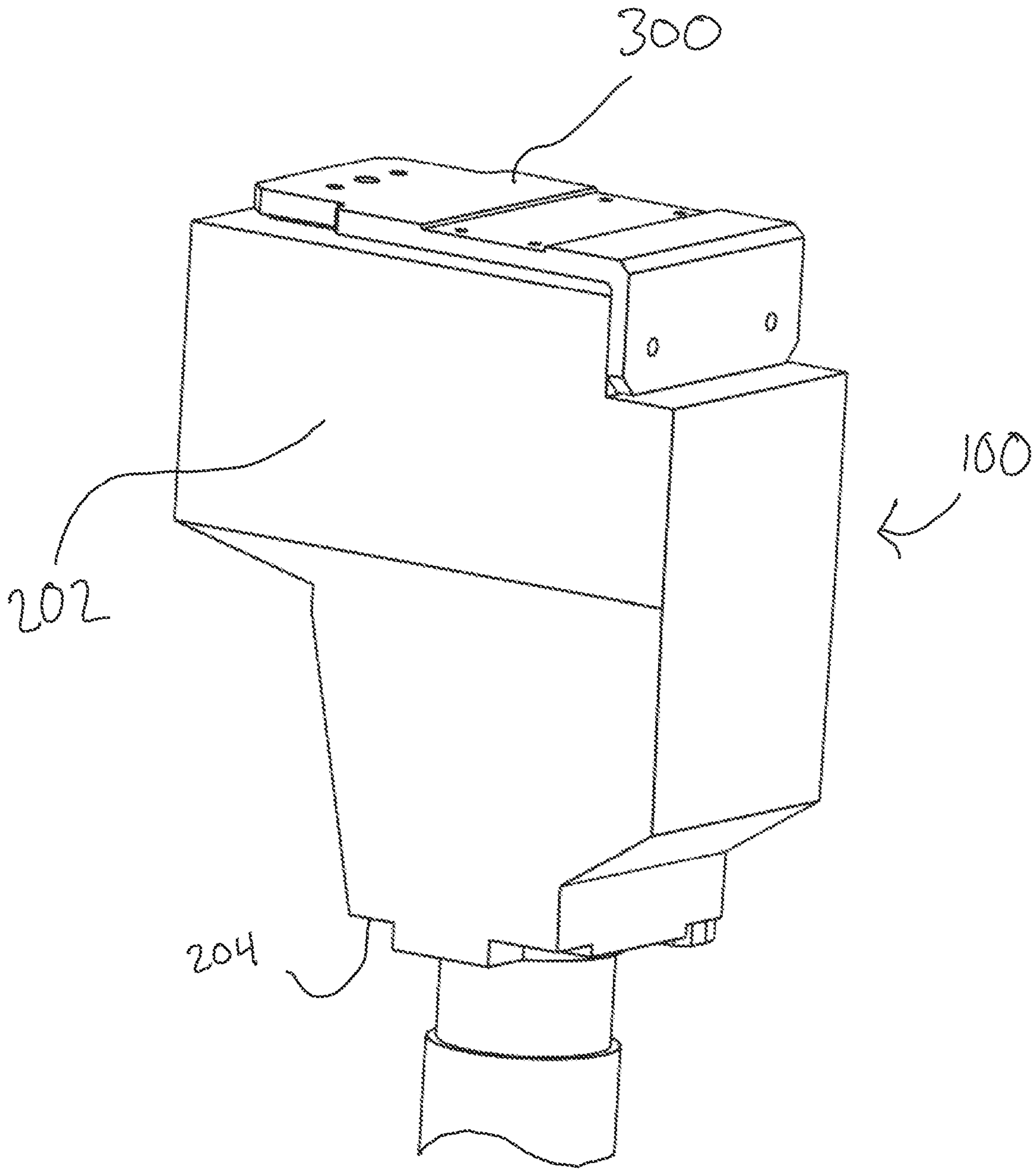
FIG. 3 illustrates an upper mount of a handle structure installed on the jackhammer body of FIG. 2, according to an aspect of the present disclosure.
Figure 4:
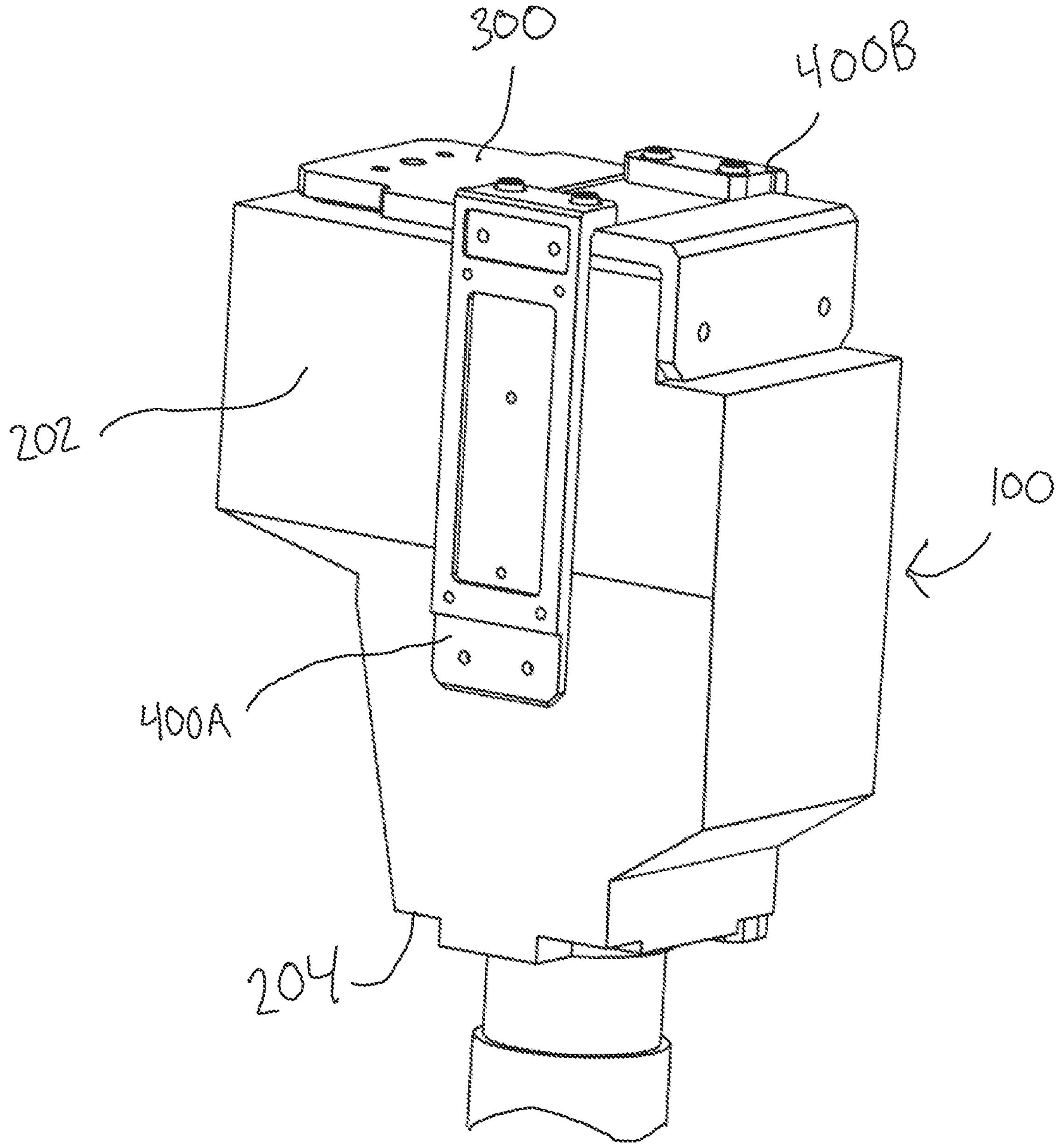
FIG. 4 illustrates side mounts of the handle structure installed on the jackhammer body of FIG. 3, according to an aspect of the present disclosure.
Figure 5:
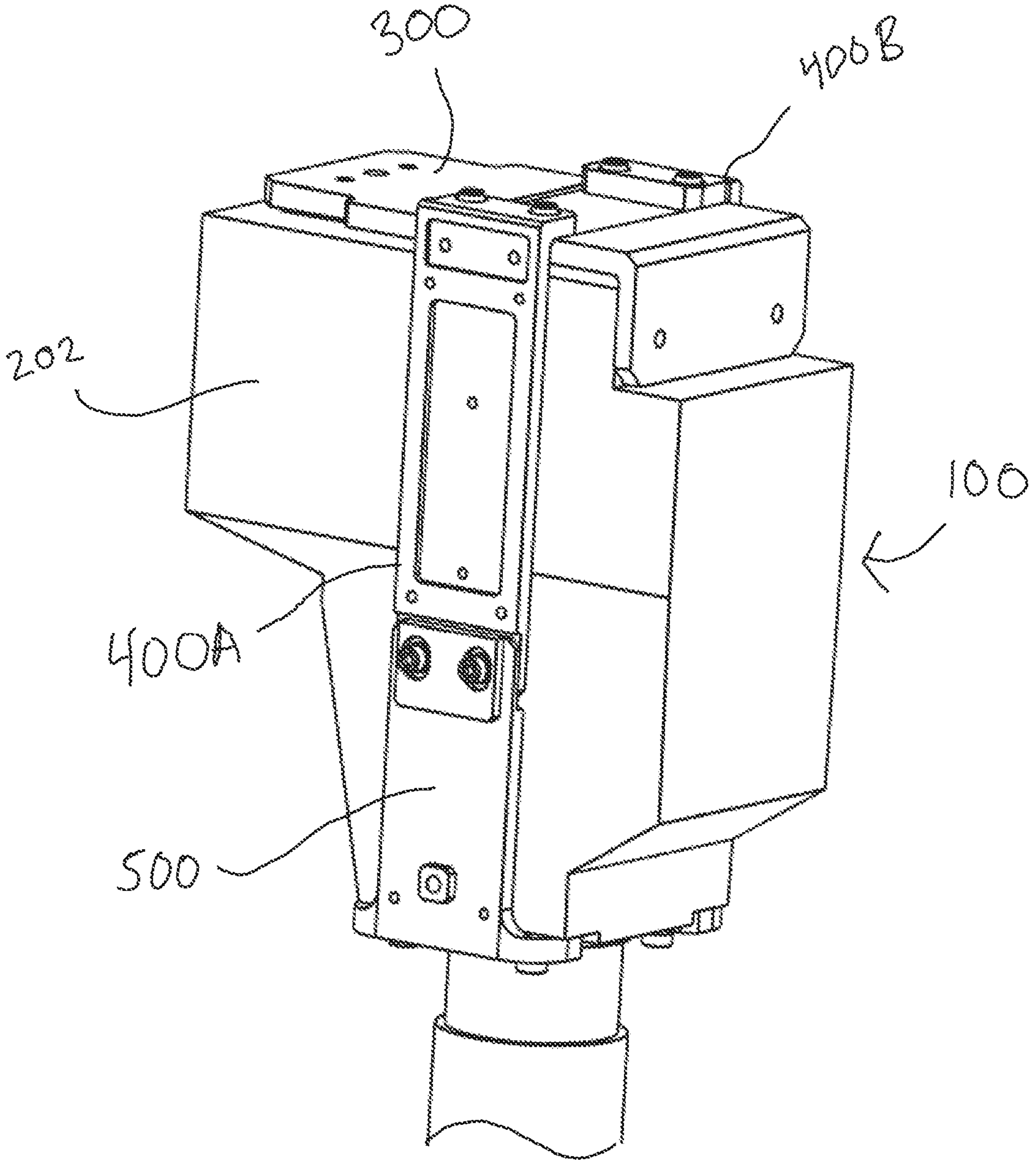
FIG. 5 illustrates lower mounts of the handle structure installed on the jackhammer body of FIG. 4, according to an aspect of the present disclosure.

As stated above, in various embodiments, the jackhammer 10 includes a mounting structure that connects the handle structure 104 to the jackhammer body 100. FIGS. 3-5 illustrate an example embodiment of the mounting structure, though the mounting structure may take other suitable forms for connecting the handle structure 104 to the jackhammer body 100 in other embodiments of the jackhammer 10. In the illustrated embodiment, the mounting structure includes a mount 300, as shown in FIG. 3, that is connected (e.g., via one or more fasteners) to the upper surface 200 of the jackhammer body 100. The illustrated mounting structure further includes a mount 400A and a mount 400B, as shown in FIG. 4, that are each connected (e.g., via one or more fasteners) to the mount 300. The mount 400A is disposed on the side surface 202A and the mount 400A is disposed on the side surface of the jackhammer body 100 directly opposite the side surface 202A. The illustrated mounting structure further includes a mount 500, as shown in FIG. 5, that is connected (e.g., via one or more fasteners) to the mount 400A and to the lower surface 204 of the jackhammer body 100. Though not illustrated, the mounting structure includes another mount 500 that is connected (e.g., via one or more fasteners) to the mount 400B and to the lower surface 204 of the jackhammer body 100.

Figure 6:
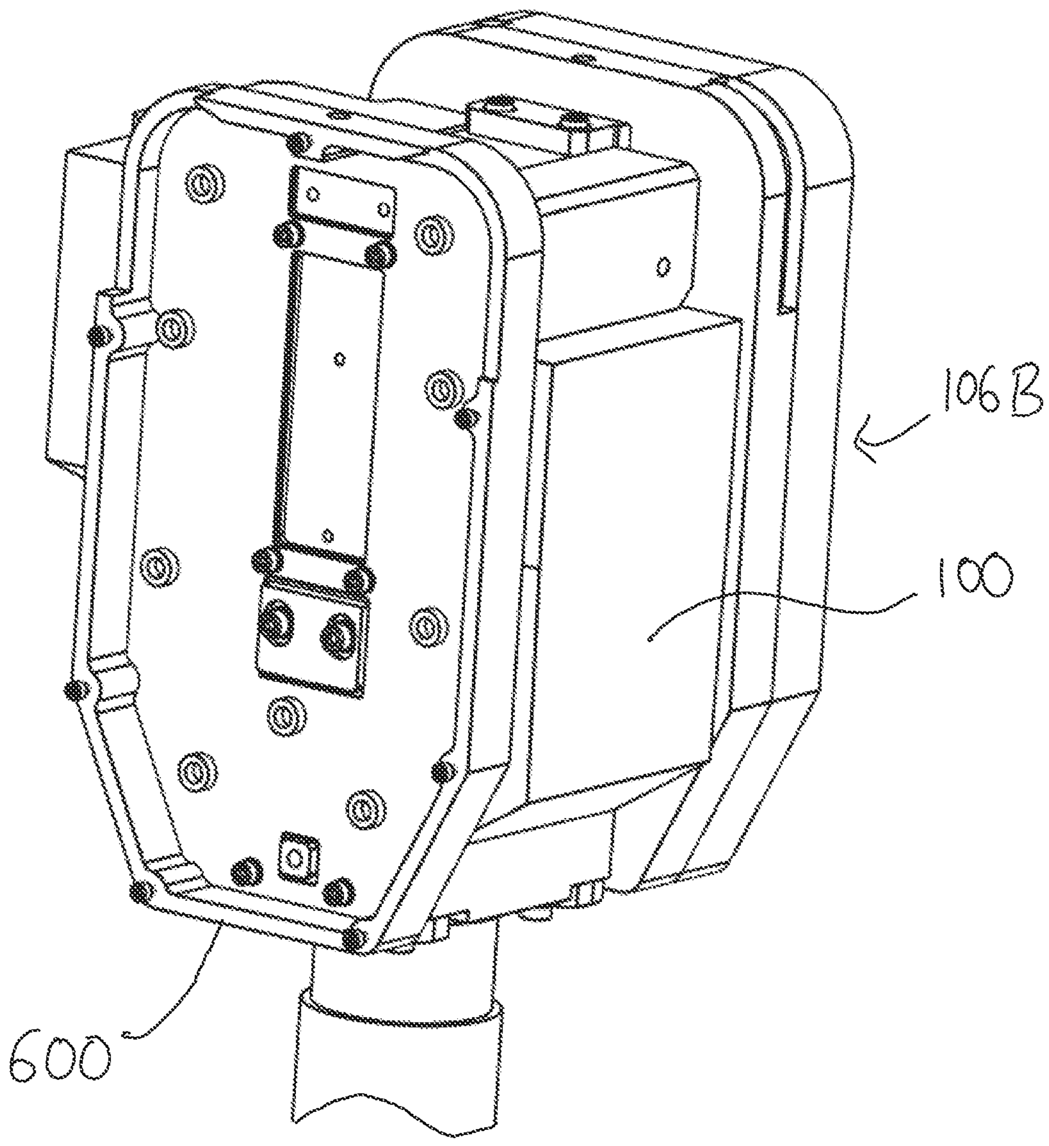
FIG. 6 illustrates an interior cover of the handle structure installed on the lower and side mounts of the jackhammer body of FIG. 5, according to an aspect of the present disclosure.
Figure 7E:
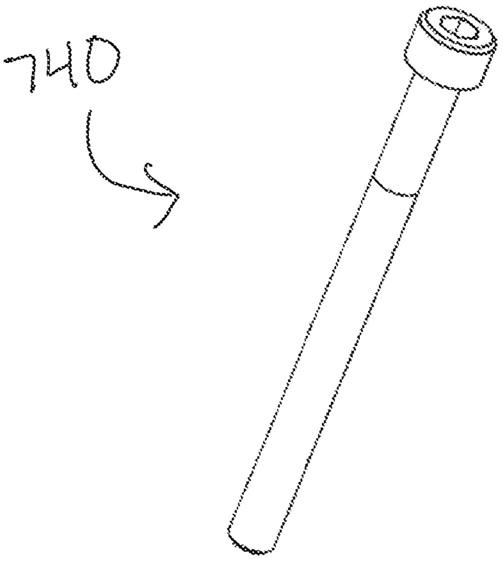
Figure 7F:
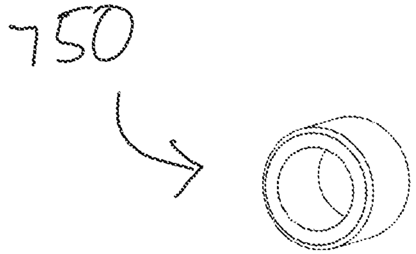

As shown in FIG. 6, the illustrated embodiment of the jackhammer 10 includes a first inner cover 600 of the housing 106A connected (e.g., via one or more fasteners) to the mounts 400A and 500. FIG. 6 shows the housing 106B, including a second inner cover disposed in, fully assembled and connected to the mount 400B and the non-illustrated mount 500.

FIGS. 7A to 7F illustrate various components of the vibration suppression system in isolation that are disposed within the housing 106A. A mount 700 includes a body 702 and a rod 704 extending from the body 702. An opening 706 extends through the body 702. The opening 706 may be threaded. The mount 700 may be connected to the mount 400A or the inner cover 600 such that the rod 704 forms the rotation axis about which components rotate at the joint 910A shown in FIG. 9. A guide 710 includes a body 712. An opening 714 and/or a slit 716 are formed in the body 712. The guide 710 is connected to the mount 400A or the inner cover 600. A stop member 720 includes a body 722 with a leg 724A and a leg 724B. Each of the legs 724A and 724B includes a respective opening 726A and 726B for resilient members to be connected to the stop member 720. The stop member 720 may be positioned within the slit 716 of the guide 710 such that the legs 722A and 722B extend beyond the edges of the body 712 of the guide 710. A nut member 730 includes a body 732 that includes a threaded opening 734. The body 732 further includes arms 736A and 736B that extend from the body 732. Each of the arms 736A and 736B includes a respective opening 738A and 738B for resilient members to be connected to the nut member 730. A threaded member 740 (threads not illustrated) is shown that is sized to extend through the opening 706 of the mount 700 and into the opening 734 of the nut member 730. Also shown is a bushing 750. The bushing 750 may be installed at the axis extending through the joint 910M (FIG. 9).

Figure 8:
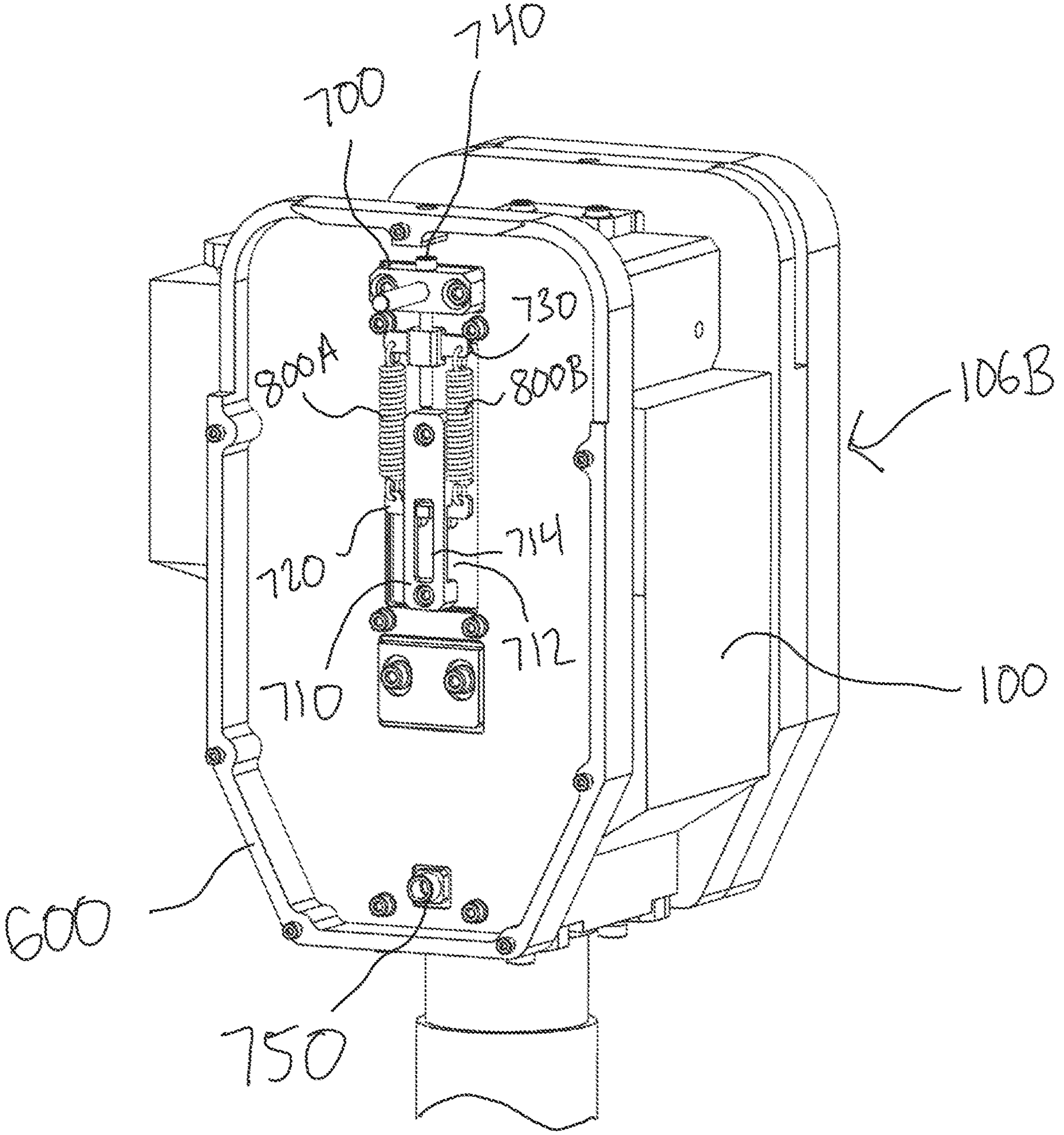
FIG. 8 illustrates the components of FIGS. 7A to 7F installed with the handle structure, according to an aspect of the present disclosure

FIG. 8 illustrates the components of FIGS. 7A to 7F installed in the handle structure 104 according to embodiments. As is described below, the mount 700, guide 710, the stop member 720, the nut member 730, and the threaded member 740 are components of an adjustment mechanism for adjusting a vertical stiffness of the vibration suppression system, which adjusts an initial vertical force of the vibration suppression system. As shown in FIG. 8, while the stop member 720 is positioned within the slit 716 of the guide 710, a resilient member 800A connects the arm 736A of the nut member 730 to the leg 724A of the stop member 720, and a resilient member 800B connects the arm 736B of the nut member 730 to the leg 724B of the stop member 720. The threaded member 740 connected to the nut member 730 maintains tension in the resilient members 800A and 800B.

Figure 9:
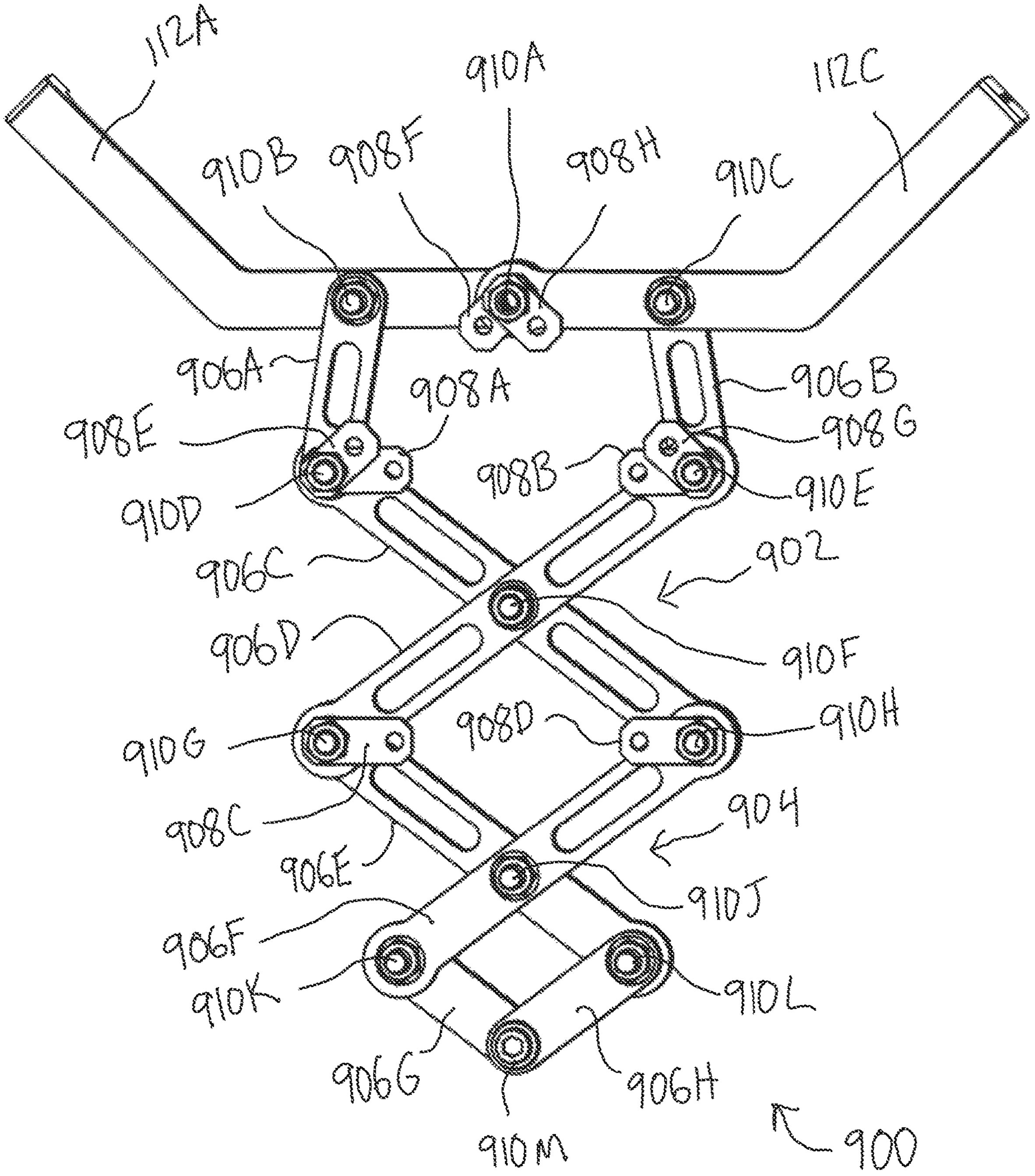
FIG. 9 illustrates a support structure of a vibration suppression system of the handle structure, according to an aspect of the present disclosure.

FIG. 9 illustrates a support structure 900 of the vibration suppression system according to some embodiments. Also illustrated are the handle member 112A and the handle member 112C rotatably connected to one another at a joint 910A. The handle member 112A and the handle member 112C are further connected to the support structure 900. For instance, the handle member 112A and the handle member 112C of the illustrated example are connected (e.g., indirectly connected via support members 906A and 906B, respectively) to an X-shaped support structure 902 and to an X-shaped support structure 904 of support structure 900. The handle member 112A and the handle member 112C are further connected to a half of an X-shaped support structure formed by the support member 906G and support member 906H. In some embodiments, the handle member 112A and the handle member 112C may be connected to one or more additional X-shaped structures for improved vibration suppression, though smaller loading capacity. For example, a third X-shaped support structure may be connected to the X-shaped support structure 904 and the support member 906G and support member 906H. Alternatively, the handle member 112A and the handle member 112C may be connected to one less X-shaped structure for improved loading capacity, though decreased vibration suppression. For example, the X-shaped support structure 904 may be removed and the support member 906G and support member 906H are connected to the X-shaped support structure 902. As such, the number of X-shaped support structures can be adjusted based on the size and strength requirements of the jackhammer 10.

The support structure 900 of the illustrated example includes an arrangement of support members in communication with handle members 112A and 112C configured to provide vibration suppression thereto in accordance with concepts herein. In the illustrated embodiment, a support member 906A is rotatably connected to the handle member 112A at a joint 910B. A support member 906B is rotatably connected to the handle member 112C at a joint 910C. The rotation mechanisms of the handle members 112A and 112C at the joints 910A, 910B, and 910C enables multi-direction (e.g., three degrees-of-freedom) vibration suppression at the handles 110A and 110B. For example, the handles 110A and 110B achieve vibration suppression in the longitudinal direction (e.g., y-axis), the lateral direction (e.g., x-axis), and the rotational direction (e.g., z-axis). A support member 906C is rotatably connected to the support member 906A at a joint 910D. A support member 906D is rotatably connected to the support member 906B at a joint 910E. The support member 906C and the support member 906D are also rotatably connected to one another at a joint 910F such that the support member 906C and the support member 906D cross over one another to thereby form the X-shaped support structure 902.

Figure 10:
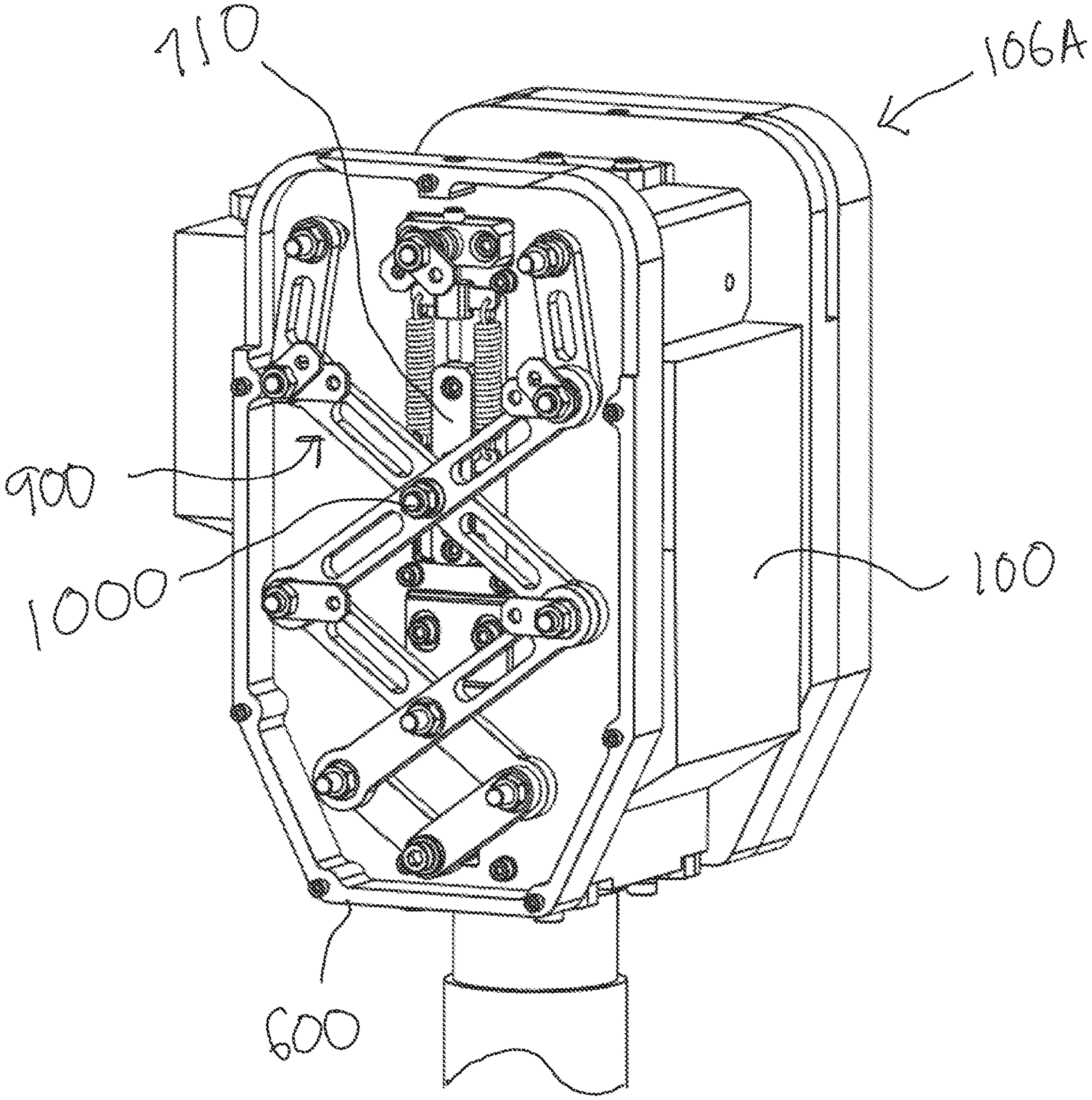
FIG. 10 illustrates the support structure of FIG. 9 installed with the handle structure, according to an aspect of the present disclosure.

FIG. 10 illustrates the support structure 900 disposed in the inner cover 600. For instance, the support structure may be connected to the inner cover 600 at each of the joints 910B to 910M. Referring to FIGS. 8 to 10, a bolt 1000 or other suitable pivot member that provides the pivot axis at joint 910F extends through openings in each of the support members 906C and 906D and into the opening 714 of the guide 710. In this way, the bolt 1000 maintains movement of the support structure 900 along the vertical direction (e.g., parallel with the length of the opening 714) as the bolt 1000 tracks within the guide 710. The guide 710 also sets a maximum vertical movement in either direction for the bolt, and therefore the support structure 900. The bolt 1000 is additionally a component of the adjustment mechanism for a vertical stiffness of the vibration suppression system. The bolt 1000 contacts the stop member 720 on the side of the stop member 720 between the stop member 720 and the nut member 730. As such, vertical movement of the bolt, and therefore compression and expansion of the support structure in the vertical direction, is controlled by force in the resilient members 800A and 800B. Adjusting the threaded member 740 adjusts a distance between the nut member 730 and the stop member 720, and therefore adjusts tension in the resilient members 800A and 800B. In this way, the vertical stiffness of the vibration suppression system is adjusted by adjusting (e.g., rotating) the threaded member 740.

Continuing with the description of the support structure 900 of FIG. 9, a support member 906E is rotatably connected to the support member 906D at a joint 910G. A support member 906F is rotatably connected to the support member 906C at a joint 910H. The support member 906E and the support member 906F are also rotatably connected to one another as a joint 910J such that the support member 906E and the support member 906F cross over one another to thereby form the X-shaped support structure 904. A support member 906G is rotatably connected to the support member 906F at a joint 910K. A support member 906H is rotatably connected to the support member 906E at a joint 910L. The support member 906G is rotatably connected to the support member 906H at a joint 910M.

Figure 11:
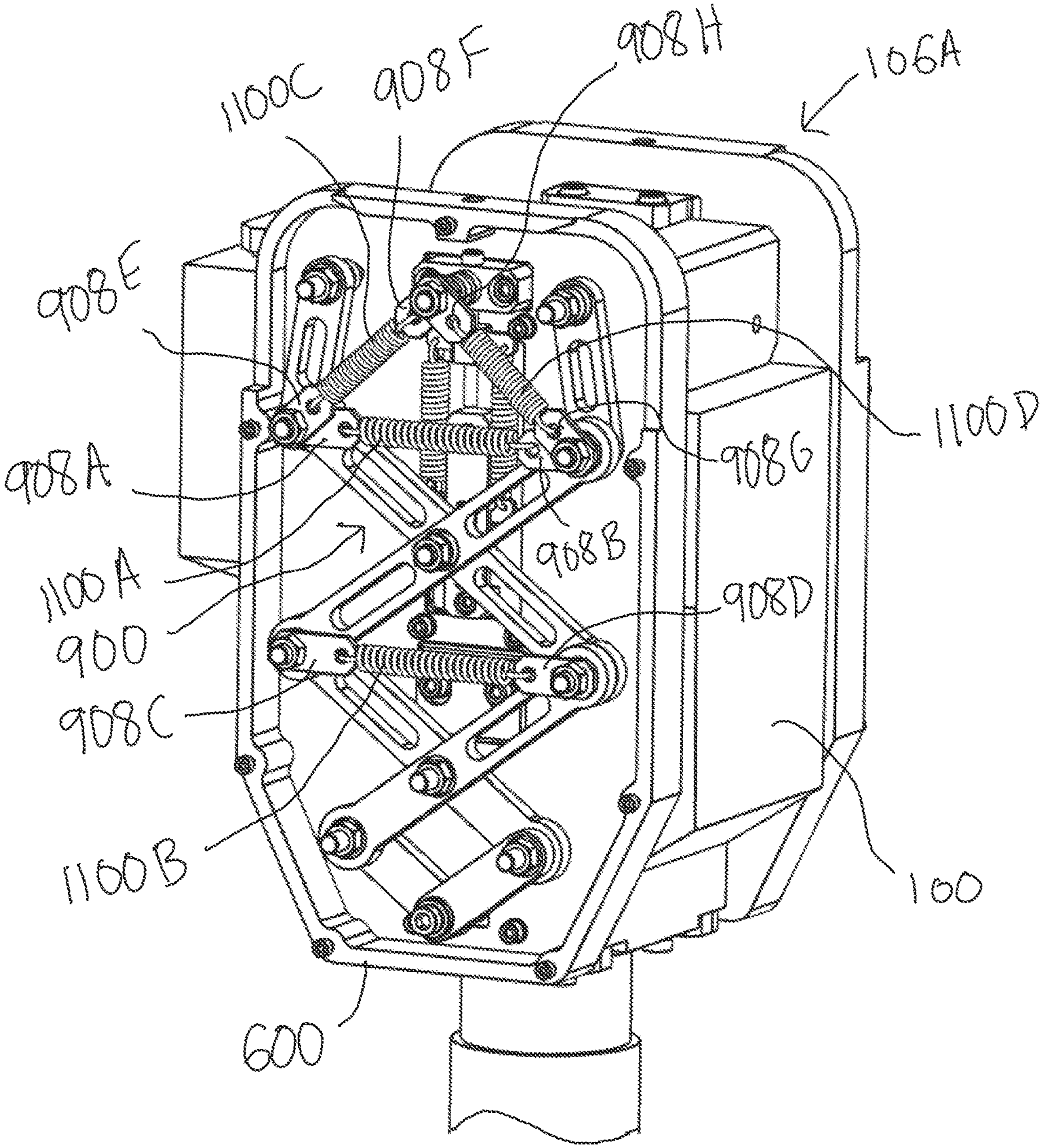
FIG. 11 illustrates resilient members installed with the support structure of the vibration suppression system of FIGS. 9 and 10, according to an aspect of the present disclosure.

Some of the support members may have an equal length, whereas some of the support members may be longer or shorter than other support members. For example, the support members 906C and 906D may be longer than the support members 906E and 906F, which may be longer than support members 906A, 906B, 906G, and 906H. A length of each of the support members 906A-906H can be determined based on the nonlinear stiffness desired in the jackhammer 10 and considering the space available and desired performance of the jackhammer 10. In at least some embodiments, each of the support members 906A-906H has a suitable stiffness to withstand the forces exerted on the jackhammer 10 as well as by each of the resilient members 1100A-1100D (FIG. 11). For example, each may be a rod having any suitable cross-section (e.g., circular, rectangular, etc.). Materials that provide the suitable stiffness for the support members 906A-906H include, for example, metal, plastic, carbon fiber, acrylic, etc.

In at least some embodiments, the support structure 900 includes one or more connect members that are constructed to connect to ends of a resilient member. For example, the illustrated embodiment of the support structure 900 includes a connect member 908A rotatably connected at the joint 910D, a connect member 908B rotatably connected at the joint 910E, a connect member 908C rotatably connected at the joint 910G, a connect member 908D rotatably connected at the joint 910H a connect member 908E rotatably connected at the joint 910D, a connect member 908F rotatably connected at the joint 910A, a connect member 908G rotatably connected at the joint 910E, and a connect member 908H rotatably connected at the joint 910A. The bushing 750 is shown disposed in the inner cover 600 in FIG. 8 such that when the support structure 900 is disposed in the inner cover 600 over the bushing 750, the bushing 750 maintains vertical alignment of the support structure 900 between the joint 910A and the joint 910M.

The vibration suppression system includes an arrangement of at least one resilient member in conjunction with the support structure 900. The stiffness and elastic nature of the at least one resilient member, in conjunction with the arrangement of the at least one resilient member with respect to the support structure 900, provides the vibration suppression effect of the vibration suppression system. As shown in FIG. 11, in at least some embodiments, the vibration suppression system includes at least one (e.g., 1, 2, or 3) resilient member 1100A connected to the connect member 908A and to the connect member 908B. In some aspects, connect members 908A and 908B may be omitted and the at least one resilient member 1100A is instead rotatably connected at the joint 910D and at the joint 910E. In various embodiments, the vibration suppression system includes at least one (e.g., 1, 2, or 3) resilient member 1100B connected to the connect member 908C and to the connect member 908D. In some aspects, connect members 908C and 908D may be omitted and the at least one resilient member 1100B is instead rotatably connected at the joint 910G and at the joint 910H.

In some embodiments, such as the illustrated embodiment, the vibration suppression system includes at least one (e.g., 1, 2, or 3) resilient member 1100C connected to the connect member 908E and to the connect member 908F. In some aspects, connect members 908E and 908F may be omitted and the at least one resilient member 1100C is instead rotatably connected at the joint 910A and at the joint 910D. In various embodiments, the vibration suppression system includes at least one (e.g., 1, 2, or 3) resilient member 1100D connected to the connect member 908G and to the connect member 908H. In some aspects, connect members 908G and 908H may be omitted and the at least one resilient member 1100D is instead rotatably connected at the joint 910A and at the joint 910E. In some embodiments, the vibration suppression system includes a connect member rotatably connected at the joint 910K and a connect member rotatably connected at the joint 910L, and at the at least one (e.g., 1, 2, or 3) resilient member rotatably connected to these connect members. In some embodiments, the vibration suppression system includes at least one (e.g., 1, 2, or 3) resilient member rotatably connected at the joint 910K and at the joint 910L.

Figure 12:
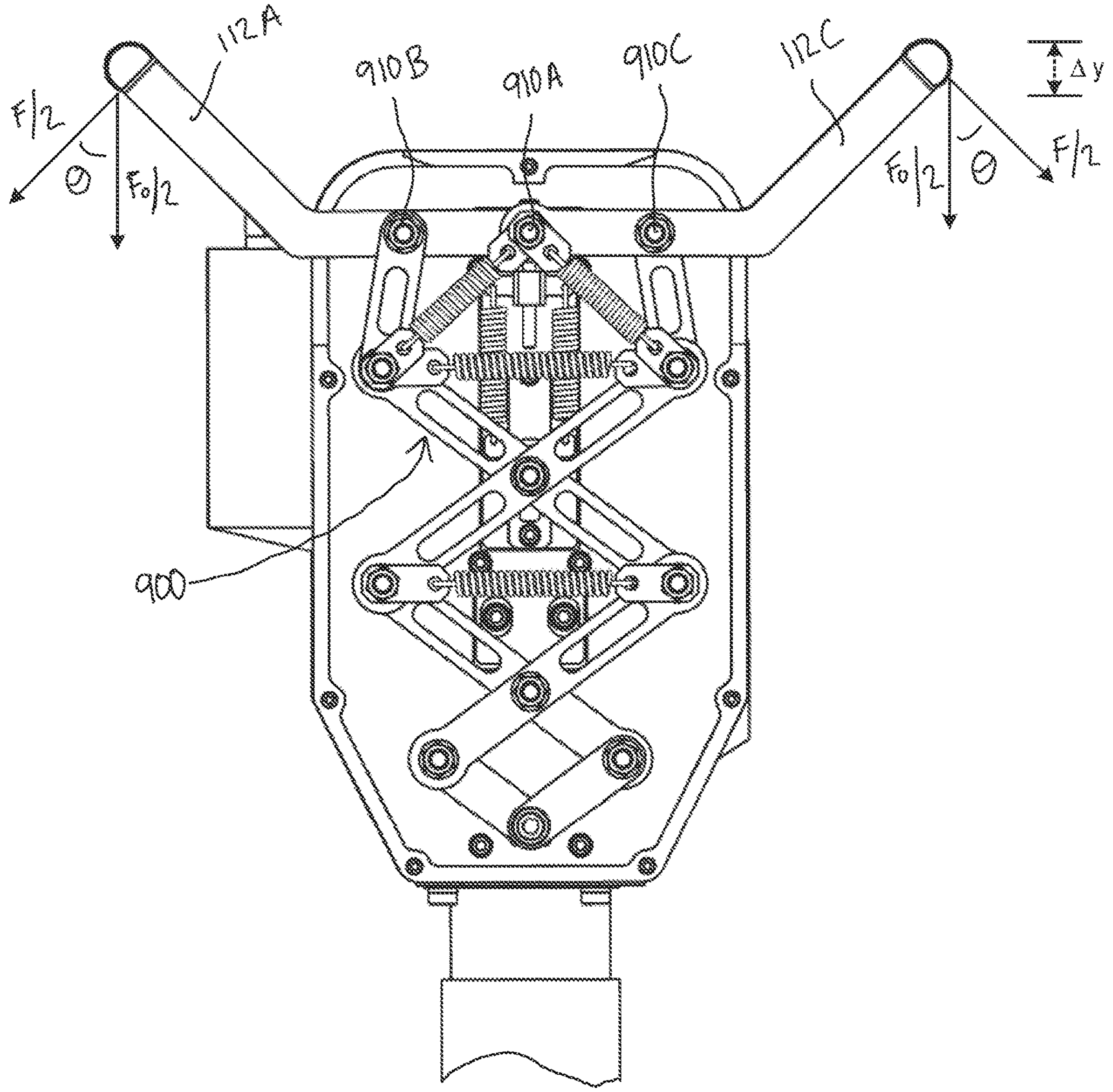
FIG. 12 illustrates handles installed with the support structure of the vibration suppression system of FIG. 11, according to an aspect of the present disclosure.

As is evident from the preceding description, the vibration suppression system includes the support structure 900, the resilient members connected to the support structure 900 (e.g., at least some of the resilient members 1100A-1100D), the mount 700, the guide 710, the stop member 720, the nut member 730, the threaded member 740, the bushing 750, and the various fasteners and other fixation components. FIG. 12 illustrates the handle members 112A and 112B connected to the fully assembled vibration suppression system.

Figure 13B:
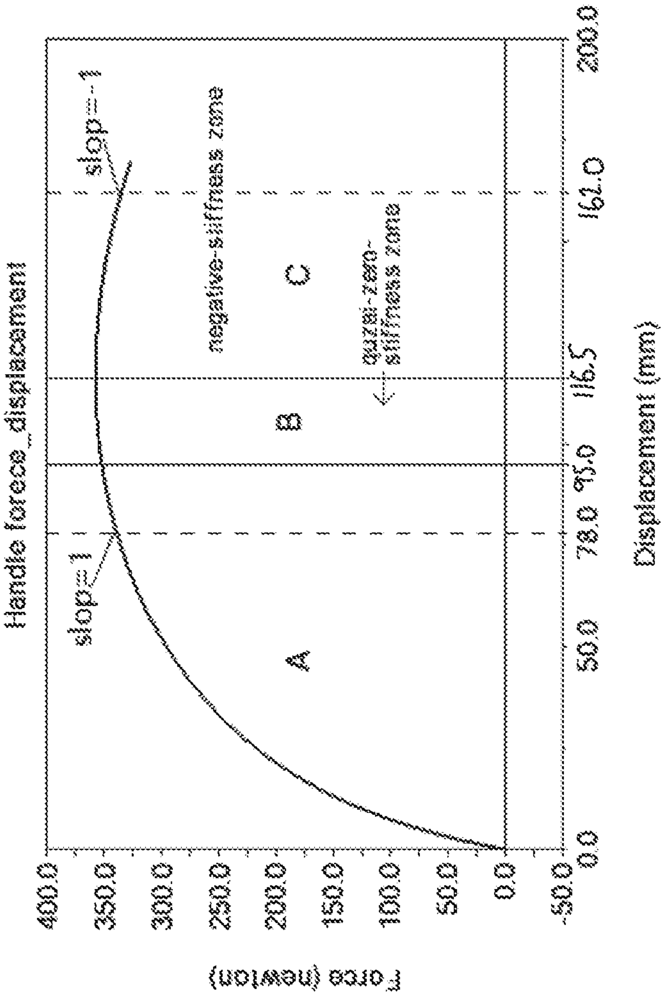
FIG. 13B is a graph showing a displacement of the handle of the handle structure in response to a vertical static force.
Figure 13A:
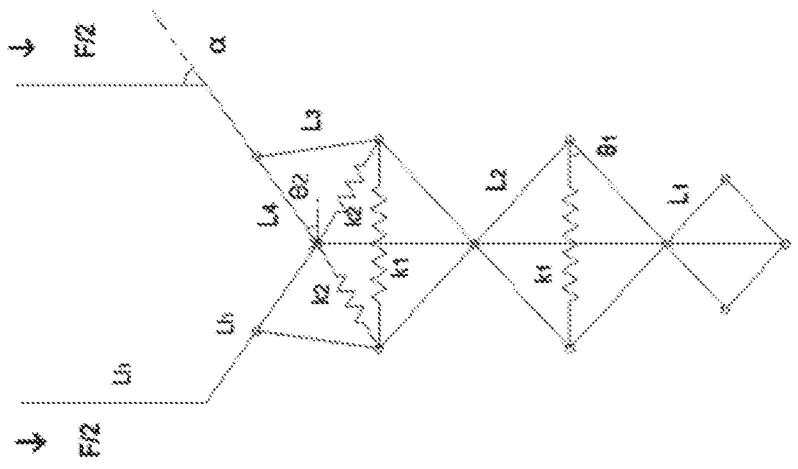
FIG. 13A is a schematic of a portion of the vibration suppression system, according to an aspect of the present disclosure.

FIG. 13A is a schematic showing various length and spring stiffness parameters of a portion of the vibration suppression system. These parameters are referenced in connection with FIGS. 13B-15. FIG. 13B is a graph showing a relationship of static force F and vertical displacement (e.g., along a line extending through the joints 910A, 910F, 910J, and 910M) for the handle 110A when L1=50 mm, L2=80 mm, L3=70 mm, L4=60 mm, Lh=100 mm, K1=100 N/mm, K2=0 N/mm and $\alpha$=45°. At the early stage of curve, the slope (dF/dy) is high, which means high static stiffness is present. As the handles are pushed down to about 78 mm, the slope (dF/dy) decreases fast to below 1. When the handles are pushed down into the "B" zone, the slope (dF/dy) is close to zero, which means the handle structure is within a quasi-zero stiffness zone. The vibration suppression system can hold improved vibration suppression in the "B" zone.

Figure 14:
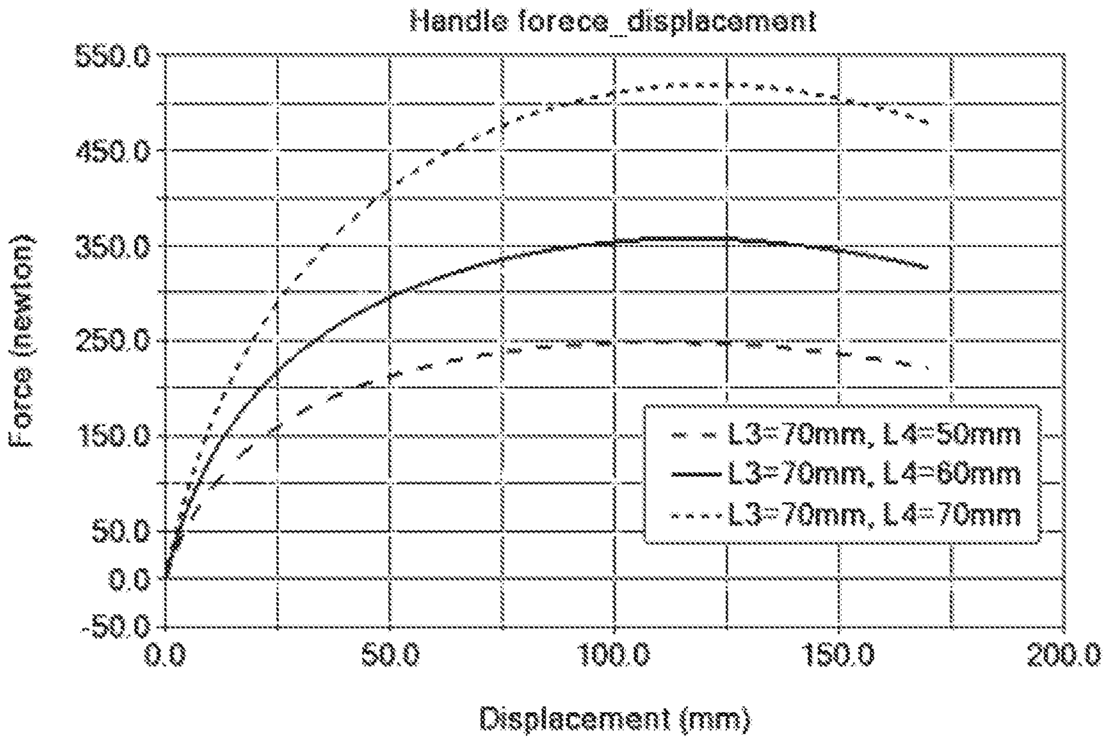
FIG. 14 is a graph showing a displacement of the handle of the handle structure with different member lengths of the handle in response to a vertical static force.

FIG. 14 is a graph that shows an influence of support member length L4 on the entire static force when L1=50 mm, L2=80 mm, L3=70 mm, Lh=100 mm, K1=100 N/mm, K2=0 N/mm and $\alpha$=45°. At the early stage of pushing down, the curve slope (static stiffness dF/dy) is larger. As the rod length L4 increases, the initial $\theta 1$ decreases, and the high static force F in zero stiffness increases. Accordingly, increasing the rod length L4 can result in greater load capacity.

Figure 15:
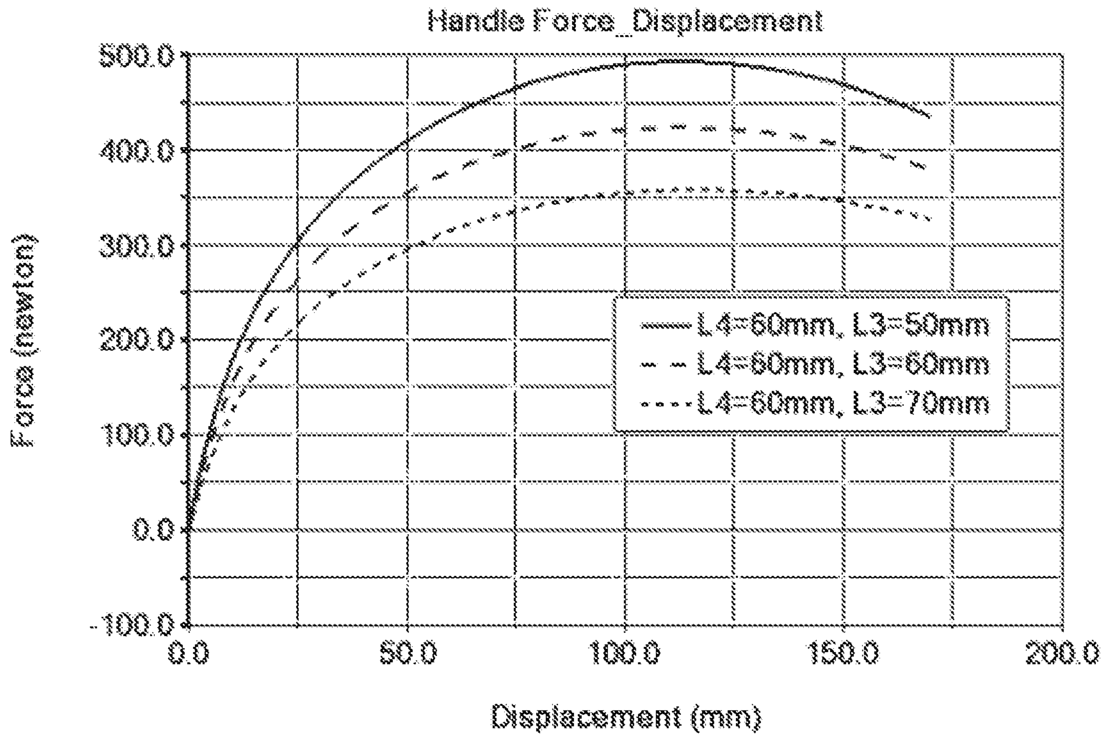
FIG. 15 is a graph showing a displacement of the handle of the handle structure with different member lengths of the handle connecting members in response to a vertical static force.

FIG. 15 is a graph that shows an influence of support member length L3 on the static force when L1=50 mm, L2=80 mm, L4=60 mm, Lh=100 mm, K1=100 N/mm, K2=0 N/mm and $\alpha$=45°. As the rod length L3 increases, the initial $\theta 1$ decreases, and the handle force capacity decreases. As such, decreasing rod length L3 can improve the handle force capacity.

Returning to FIG. 12, further shown are vectors indicating a tangential force F applied to the handles 110A and 110B and indicating a vertical component F0 of the tangential force F. Also shown are angles $\theta$ between force F and the vertical direction, and a vertical displacement $\Delta y$ of the handles 110A and 110B. FIG. 16 is a table showing force and displacement values in tangential and vertical directions of the handles 110A and 110B for an example vibration suppression system that includes one resilient member 1100A connected to the connect member 908A and to the connect member 908B, two resilient members 1100B connected to the connect member 908C and to the connect member 908, one resilient member 1100C rotatably connected at the joint 910A and at the joint 910D, one resilient member 1100D rotatably connected at the joint 910A and at the joint 910E, and one resilient member rotatable connected at the joint 910K and at the joint 910L. In the table, the initial vertical down force is about 57 N because of the initial force and pretension force of the resilient member 1100A, two resilient members 1100B, and one one resilient member rotatable connected at the joint 910K and at the joint 910L. When the handles 110A and 110B move down to zero stiffness position at a displacement of 95 mm, the jackhammer 10 reaches a maximum force capacity of 182.28N.

Figure 18:
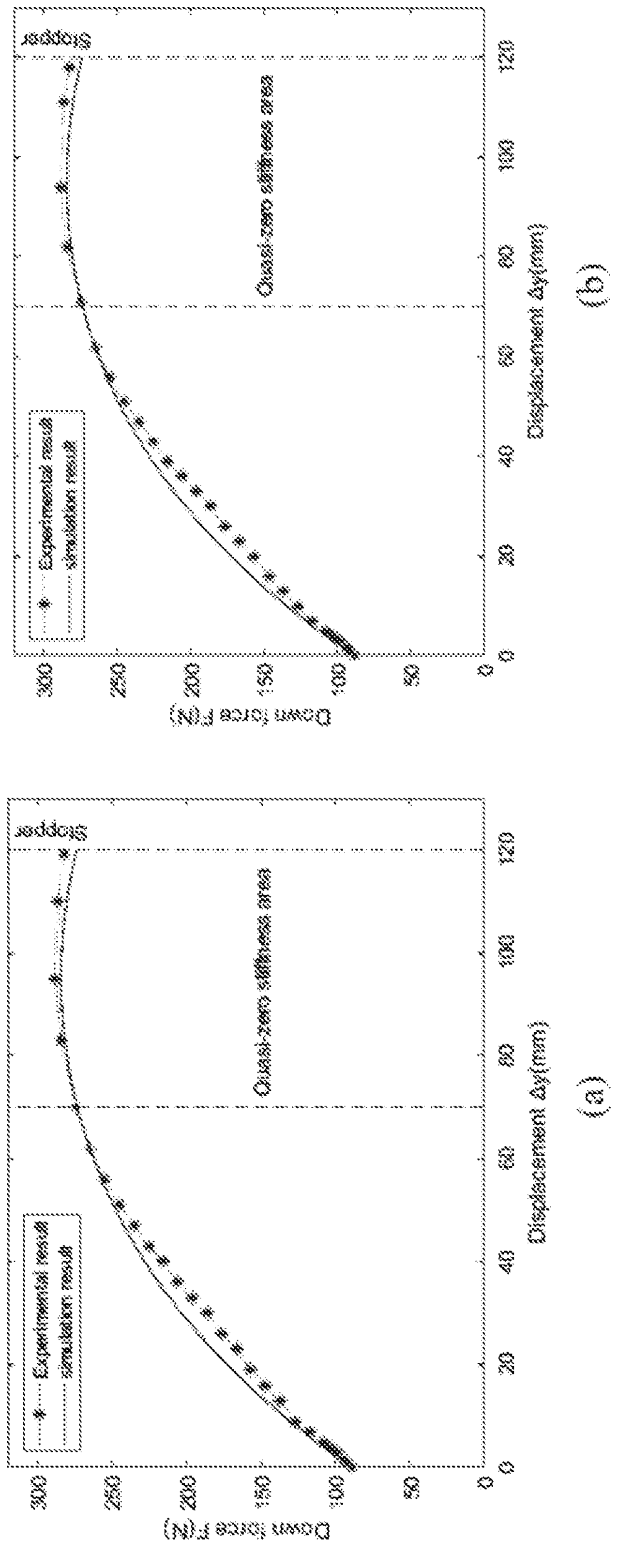
FIG. 18 shows graphs depicting the (a) first measurement results and (b) second measurement results of the table of FIG. 17 in comparison to simulation force and displacement data.

FIGS. 17 and 18 show the experimental and simulation results of tangential forces F and vertical displacement of the handles 110A and 110B for an example vibration suppression system that has 8 horizontal resilient members (e.g., resilient members 1100A or 11001B) and 4 diagonal resilient members (e.g., resilient members 1100C or 1100D). The initial force and maximum force increases to 80N and 288N respectively. When the handles 110A and 110B push down to about 95 mm, the vibration suppression system reaches a maximum force point. After this maximum force point, the pushing force begins to decrease. The quasi-zero stiffness area is from 70 mm to 120 mm.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.10% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of the present application is not intended to be limited to the particular embodiments of the process, machine, manufacture, composition of matter, means, methods and steps described in the specification. The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A handle structure for vibration suppression comprising:
- a first handle member rotatable about a first axis;
- a second handle member connected to the first handle member and rotatable about the first axis;
- a first support member rotatable about a second axis and a third axis, wherein the second axis is disposed at a first location on the first handle member;
- a second support member rotatable about a fourth axis and a fifth axis, wherein the fourth axis is disposed at a second location on the second handle member;
- a third support member connected to the first support member and rotatable about the third axis and a sixth axis; and
- a fourth support member connected to the second support member and rotatable about the fifth axis and the sixth axis.

2. The handle structure of claim 1, further comprising:
- a rod extending along the first axis and through openings in each of the first and second handle members;
- a nut;
- a fixation member extending through the rod and connected to the nut;
- a stop member; and
- at least one resilient member that connects the nut to the stop member.

3. The handle structure of claim 2, further comprising a guide member that includes a slit, wherein the stop member is disposed within the slit.

4. The handle structure of claim 3, wherein rotating the fixation member adjusts an amount of resistance of the first and second handle members to rotate about the first axis.

5. The handle structure of claim 1, further comprising:
- a first resilient member rotatable about the first axis and the third axis; and
- a second resilient member rotatable about the first axis and the fifth axis.

6. The handle structure of claim 5, further comprising a third resilient member rotatable about the third axis and the fifth axis.

7. The handle structure of claim 1, wherein the third support member is further rotatable about a seventh axis, wherein the fourth support member is further rotatable about an eighth axis, the handle structure further comprising:
- a fifth support member rotatable about the seventh axis, a ninth axis, and a tenth axis;
- a sixth support member rotatable about the eighth axis, the ninth axis, and an eleventh axis;
- an eighth support member rotatable about the eleventh axis and a twelfth axis; and
- a ninth support member rotatable about the tenth axis and the twelfth axis.

8. The handle structure of claim 7, further comprising a fourth resilient member rotatable about the seventh axis and the eighth axis.

9. A handle structure for vibration suppression comprising:
- a first handle;
- a second handle;
- a first vibration suppression system rotatably connected to the first handle and to the second handle, wherein the first vibration suppression system includes a first X-shaped support structure; and a second vibration suppression system rotatably connected to the first handle and to the second handle, wherein the second vibration suppression system includes a second X-shaped support structure, wherein the first handle and the second handle are each configured to rotate about a first rotation joint.

10. The handle structure of claim 9, wherein the first X-shaped support structure is rotatably connected to the first handle via a first support member and to the second handle via a second support member, and wherein the second X-shaped support structure is rotatably connected to the first handle via a third support member and to the second handle via a fourth support member.

11. The handle structure of claim 10, wherein the first X-shaped support structure includes a fifth support member and a sixth support member, wherein the fifth support member is connected to the first support member at a second rotation joint, wherein the sixth support member is connected to the second support member at a third rotation joint, and wherein the fifth support member is connected to the sixth support member at a fourth rotation joint.

12. The handle structure of claim 11, further comprising a resilient member connecting the second rotation joint to the third rotation joint.

13. The handle structure of claim 10, further comprising a third X-shaped support structure rotatably connected to the first X-shaped support structure.

14. The handle structure of claim 9, wherein the first vibration suppression system includes a first resilient member connected to the first handle and to the first X-shaped support structure.

15. A jackhammer comprising:

a body;

a housing; and a handle structure connected to the body, wherein the handle structure includes:

a plurality of X-shaped support structures that each include a first support member and a second support member;

a handle connected to the plurality of X-shaped support structures; and a resilient member that connects the first support member of a first X-shaped support structure of the plurality of X-shaped support structures to the second support member of the first X-shaped support structure, wherein at least a portion of the plurality of X-shaped support structures are disposed within the housing.

16. The jackhammer of claim 15, further comprising a mounting structure connected to the body, wherein the handle structure is connected to the body via the mounting structure.

17. The jackhammer of claim 15, wherein the handle is a first handle, the jackhammer further comprising a second handle, wherein the plurality of X-shaped support structures includes a first plurality of X-shaped support structures and a second plurality of X-shaped support structures, wherein each of the first handle and the second handle is connected to the first plurality of X-shaped support structures and the second plurality of X-shaped support structures.

18. The jackhammer of claim 17, wherein the first plurality of X-shaped support structures are disposed on a first side of the body, and wherein the second plurality of X-shaped support structures are disposed on a second side of the body directly opposite the first side.

19. The jackhammer of claim 15, wherein the resilient member is a first resilient member, wherein the jackhammer further comprises a second resilient member, and wherein the plurality of X-shaped support structures includes a first X-shaped support structure and a second X-shaped support structure connected to the first X-shaped support structure, the first resilient member connects the first support member of the first X-shaped support structure to the second support member of the first X-shaped support structure, and the second resilient member connects the first support member of the second X-shaped support structure to the second support member of the second X-shaped support structure.

20. The jackhammer of claim 15, further comprising:

a second resilient member that connects the first support member of the first X-shaped support structure to the handle structure; and a third resilient member that connects the second support member of the first X-shaped support structure to the handle structure.

* * * * *